US012581440B1

(12) United States Patent
Tran et al.

(10) Patent No.: US 12,581,440 B1
(45) Date of Patent: Mar. 17, 2026

(54) MAINTAINING AREA NETWORKS IN RESPONSE TO LOSSES OF COORDINATORS

(71) Applicant: Amazon technologies, Inc., Seattle, WA (US)

(72) Inventors: Binh Tran, Mountain View, CA (US); Jonathan Chan, Los Altos, CA (US); Chiu Ngok Eric Wong, San Jose, CA (US); Haoran Xiao, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 18/465,638

(22) Filed: Sep. 12, 2023

(51) Int. Cl.
*H04W 56/00* (2009.01)
(52) U.S. Cl.
CPC ............................... *H04W 56/0015* (2013.01)
(58) Field of Classification Search
CPC ...... H04B 1/69; H04B 1/6904; H04B 1/7156; H04L 41/16; H04W 72/115; H04W 48/16; H04W 72/042; H04W 56/001; H04W 84/18
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 11,039,342 B1 | 6/2021 | Chung et al. |
| 2003/0002712 A1 | 1/2003 | Steenburgh et al. |
| 2004/0181467 A1 | 9/2004 | Raiyani et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Phuoc H Doan
(74) *Attorney, Agent, or Firm* — Athorus, PLLC

(57) ABSTRACT

A synchronized wireless network includes a root coordinator and any number of other coordinators that are synchronized with the root coordinator, e.g., according to a communication schedule established by the root coordinator and transmitted to the other coordinators in one or more beacons. The other coordinators coordinate operations of individual area networks by establishing communication schedules for the respective area networks, and transmitting beacons including such other schedules to any number of nodes of such networks. Upon detecting a loss of connectivity with the root coordinator, coordinators or nodes of area networks monitor channels and timeslots for beacons transmitted by other coordinators of the synchronized wireless network, and elect one of their own to serve as a root coordinator, or select one of the other coordinators for synchronization, based on contents of such beacons.

20 Claims, 18 Drawing Sheets

(56) References Cited

U.S. PATENT DOCUMENTS

| | | | |
|---|---|---|---|
| 2005/0243765 A1 | 11/2005 | Schrader et al. | |
| 2007/0025384 A1 | 2/2007 | Ayyagari et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0279155 A1 | 11/2008 | Pratt, Jr. et al. | |
| 2009/0121017 A1 | 5/2009 | Cato et al. | |
| 2009/0245573 A1 | 10/2009 | Saptharishi et al. | |
| 2010/0111050 A1 | 5/2010 | Jeong | |
| 2011/0011936 A1 | 1/2011 | Morandi et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0016581 A1 | 1/2014 | Jeon et al. | |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |
| 2016/0157176 A1 | 6/2016 | Yu et al. | |
| 2016/0174192 A1* | 6/2016 | Raghu | H04W 72/23 370/329 |
| 2016/0174218 A1 | 6/2016 | Stanescu et al. | |
| 2016/0330713 A1 | 11/2016 | Vijayasankar | |
| 2017/0325224 A1* | 11/2017 | Shudark | H04W 74/04 |
| 2018/0027440 A1 | 1/2018 | Sun et al. | |
| 2018/0109952 A1 | 4/2018 | Abraham et al. | |
| 2019/0037506 A1 | 1/2019 | Singh et al. | |
| 2019/0349786 A1 | 11/2019 | Hett et al. | |
| 2022/0240164 A1 | 7/2022 | Hett et al. | |
| 2022/0377793 A1 | 11/2022 | Uhling et al. | |
| 2023/0059363 A1 | 2/2023 | Strater et al. | |
| 2024/0089839 A1 | 3/2024 | Bhat | |
| 2024/0365189 A1 | 10/2024 | Fratti et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Umer, Javed, et al., "Frequency hopping in IEEE 802.15. 4 to mitigate IEEE 802.11 interference and fading," Journal of Systems Engineering and Electronics, 29.3 (Jun. 2018): 445-455, URL: https://ieeexplore.ieee.org/stamp/stamp.jsp?tp=&arnumber= 8406341.

Watteyne, Thomas, Maria-Rita Palattella, and Luigi Alfredo Grieco, "Using IEEE 802.15. 4e Time-Slotted Channel Hopping (TSCH) in the internet of things (IoT): Problem Statement." Internet Engineering Task Force (May 2015), Informational, 23 pages.

* cited by examiner

ENHANCED BEACON i TRANSMITTED BY COORDINATORS

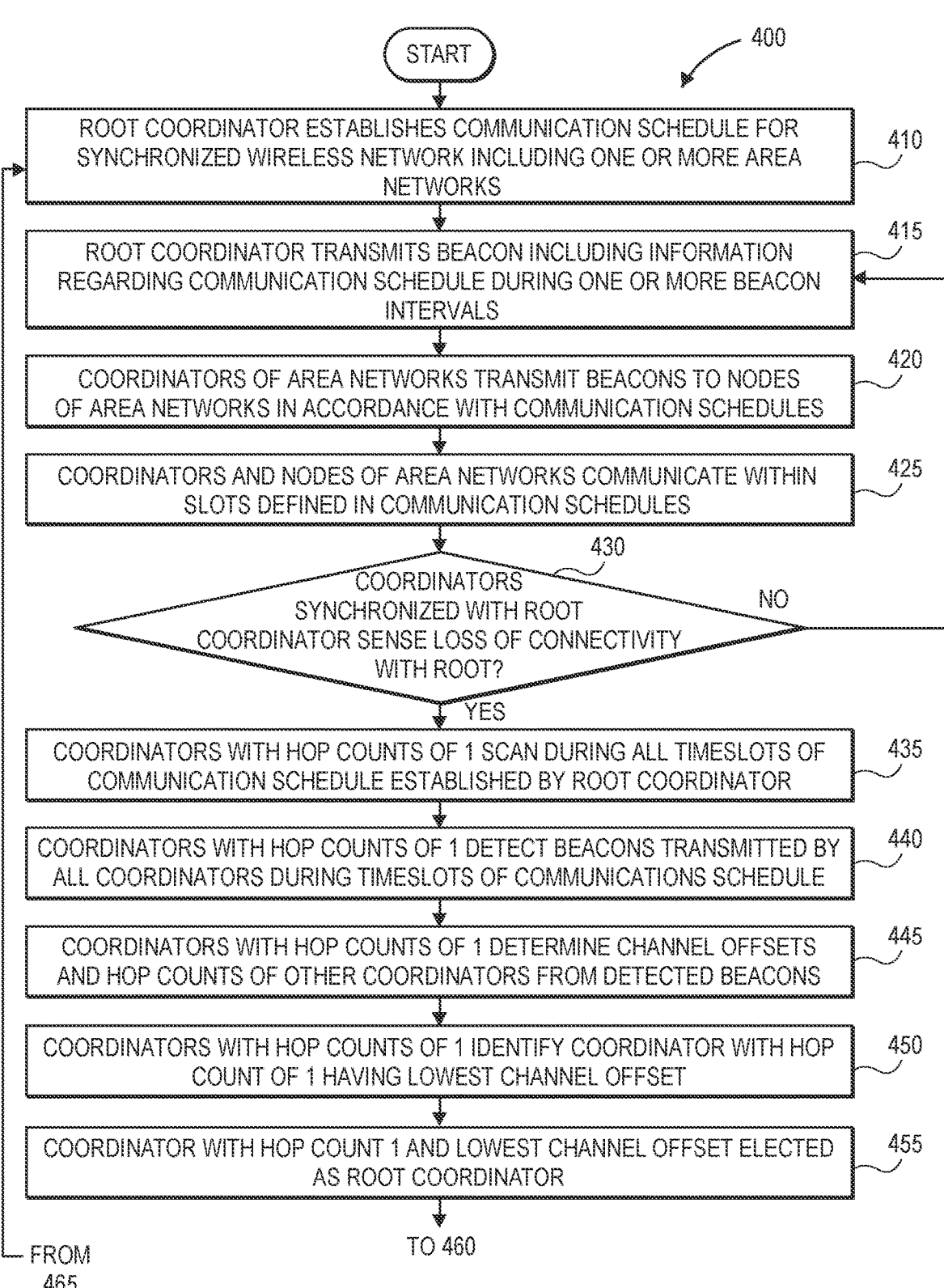

START

400

ROOT COORDINATOR ESTABLISHES COMMUNICATION SCHEDULE FOR SYNCHRONIZED WIRELESS NETWORK INCLUDING ONE OR MORE AREA NETWORKS
410

ROOT COORDINATOR TRANSMITS BEACON INCLUDING INFORMATION REGARDING COMMUNICATION SCHEDULE DURING ONE OR MORE BEACON INTERVALS
415

COORDINATORS OF AREA NETWORKS TRANSMIT BEACONS TO NODES OF AREA NETWORKS IN ACCORDANCE WITH COMMUNICATION SCHEDULES
420

COORDINATORS AND NODES OF AREA NETWORKS COMMUNICATE WITHIN SLOTS DEFINED IN COMMUNICATION SCHEDULES
425

COORDINATORS SYNCHRONIZED WITH ROOT COORDINATOR SENSE LOSS OF CONNECTIVITY WITH ROOT?
430
NO

YES

COORDINATORS WITH HOP COUNTS OF 1 SCAN DURING ALL TIMESLOTS OF COMMUNICATION SCHEDULE ESTABLISHED BY ROOT COORDINATOR
435

COORDINATORS WITH HOP COUNTS OF 1 DETECT BEACONS TRANSMITTED BY ALL COORDINATORS DURING TIMESLOTS OF COMMUNICATIONS SCHEDULE
440

COORDINATORS WITH HOP COUNTS OF 1 DETERMINE CHANNEL OFFSETS AND HOP COUNTS OF OTHER COORDINATORS FROM DETECTED BEACONS
445

COORDINATORS WITH HOP COUNTS OF 1 IDENTIFY COORDINATOR WITH HOP COUNT OF 1 HAVING LOWEST CHANNEL OFFSET
450

COORDINATOR WITH HOP COUNT 1 AND LOWEST CHANNEL OFFSET ELECTED AS ROOT COORDINATOR
455

FROM 465

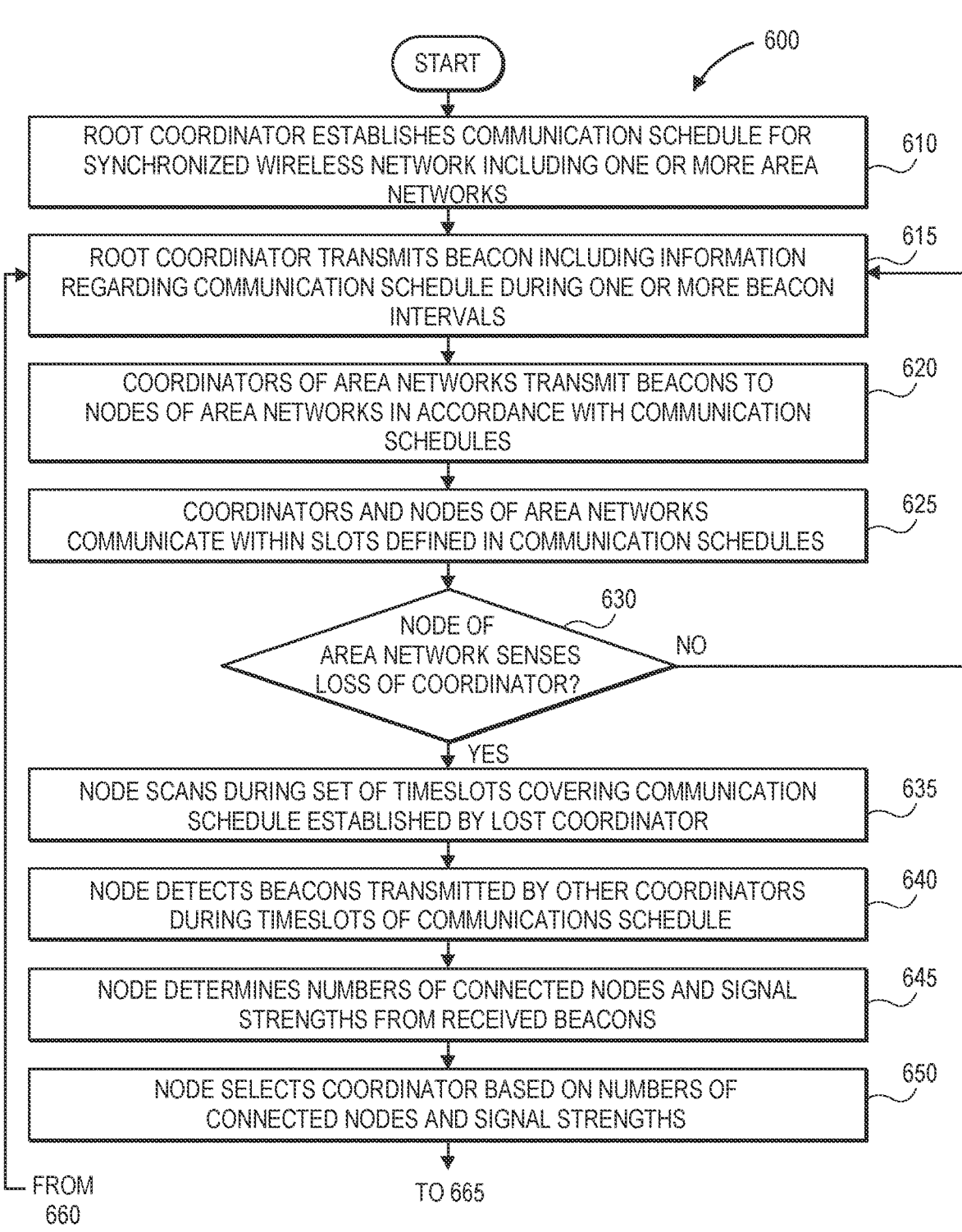

START

600

ROOT COORDINATOR ESTABLISHES COMMUNICATION SCHEDULE FOR SYNCHRONIZED WIRELESS NETWORK INCLUDING ONE OR MORE AREA NETWORKS — 610

ROOT COORDINATOR TRANSMITS BEACON INCLUDING INFORMATION REGARDING COMMUNICATION SCHEDULE DURING ONE OR MORE BEACON INTERVALS — 615

COORDINATORS OF AREA NETWORKS TRANSMIT BEACONS TO NODES OF AREA NETWORKS IN ACCORDANCE WITH COMMUNICATION SCHEDULES — 620

COORDINATORS AND NODES OF AREA NETWORKS COMMUNICATE WITHIN SLOTS DEFINED IN COMMUNICATION SCHEDULES — 625

NODE OF AREA NETWORK SENSES LOSS OF COORDINATOR? — 630       NO

YES

NODE SCANS DURING SET OF TIMESLOTS COVERING COMMUNICATION SCHEDULE ESTABLISHED BY LOST COORDINATOR — 635

NODE DETECTS BEACONS TRANSMITTED BY OTHER COORDINATORS DURING TIMESLOTS OF COMMUNICATIONS SCHEDULE — 640

NODE DETERMINES NUMBERS OF CONNECTED NODES AND SIGNAL STRENGTHS FROM RECEIVED BEACONS — 645

NODE SELECTS COORDINATOR BASED ON NUMBERS OF CONNECTED NODES AND SIGNAL STRENGTHS — 650

FROM 660

MAINTAINING AREA NETWORKS IN RESPONSE TO LOSSES OF COORDINATORS

BACKGROUND

Time-slotted channel hopping (or "TSCH," sometimes called time-synchronized channel hopping), is a medium access control ("MAC") that is intended to coordinate all transmissions of packets (e.g., data) between nodes of networks, such as personal area networks (or "PAN"). In some implementations, nodes of such networks may include systems or sensors of any type or form.

All frame transmissions within a PAN occur in selected channels of a set of channels and in designated timeslots of the slotframe according to a communication schedule. A communication schedule may include a plurality of cells, each corresponding to a link between nodes of the PAN, which may be dedicated to communications between two specific nodes, or shared by (or open to communications between) any numbers of nodes. When a node joins a PAN, the node is allocated a number of timeslots for communications with a coordinator node, or with any other nodes of the PAN. Cells that have been designated for nodes to transmit data within a PAN may hop in tandem over a set of channels, defined by a communication schedule or frequency plan that covers a plurality of timeslots that repeat over time, e.g., in a slotframe.

A PAN that operates according to TSCH may include multiple gateways or coordinators, with each gateway or coordinator in turn providing connectivity to a set of nodes (e.g., leaf nodes, outer nodes, terminal nodes, or others, which may include one or more devices such as sensors). Each of the gateways or coordinators and their respective nodes may be synchronized in time, and may adopt TSCH to enable access to channels. Each of the gateways or coordinators may also be synchronized to a single coordinator, which may be called a "root coordinator," and may serve as a timing master for every other device of the PAN, including any number of other coordinators and nodes connected to such coordinators (e.g., sensors or other devices).

Timing is essential to the operation of every PAN that operates according to TSCH, especially a PAN that features multiple gateways or coordinators, each of which must be synchronized to a single source clock, established by a single root coordinator. Gateways or coordinators and other nodes in a PAN utilize a parent-child relationship, in which a node acting as a parent passes timing information down to nodes that act as its children. Proper operation of a PAN necessarily relies on each and every node of the PAN to operate in accordance with the communication schedule established by the root coordinator, and to ensure that each node transmits and receives data during its own timeslots.

BRIEF DESCRIPTION OF THE DRAWINGS

FIGS. 1A through 1I are views of aspects of one system for maintaining area networks in accordance with implementations of the present disclosure.

FIGS. 4A and 4B are a flow chart of one process for maintaining area networks in accordance with implementations of the present disclosure.

FIGS. 6A and 6B are a flow chart of one process for maintaining area networks in accordance with implementations of the present disclosure.

DETAILED DESCRIPTION

Figure 1A:
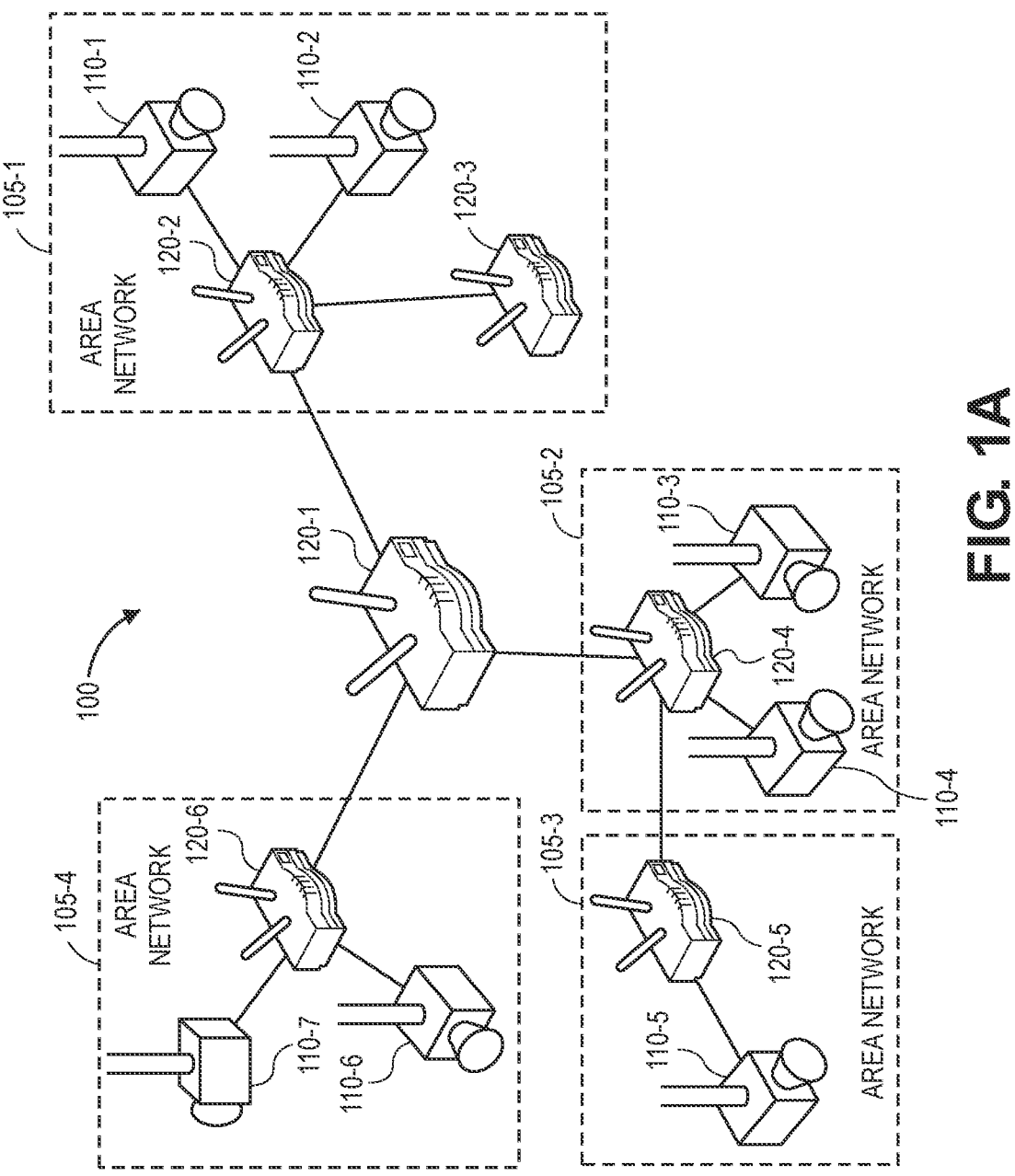

As is set forth in greater detail below, the systems and methods of the present disclosure are directed to maintaining area networks, such as PANs, including a synchronized wireless network of multiple area networks. More specifically, the systems and methods disclosed herein are utilized in connection with multiple area networks through the use of a single source clock maintained by a root coordinator, and forming a synchronization tree representing the area network that stems from the root coordinator. In some implementations, a synchronized wireless network (e.g., a cross-PAN synchronization network) may be formed by a root coordinator and a plurality of coordinator nodes (or gateways or coordinators), each of which may be configured for communication by a communication schedule established in accordance with a channel hopping protocol, e.g., a TSCH protocol, and may operate a PAN including any number of other nodes (e.g., coordinator nodes or other devices or systems). A root coordinator may advertise a communication schedule of the synchronized wireless network to coordinator nodes of the network by transmissions of beacons, e.g., enhanced beacons, to the coordinator nodes and any other nodes of the network. The enhanced beacon may include synchronization, channel hopping, or timeslot (or slotframe) or other information from the coordinator node within the network.

The systems and methods of the present disclosure may reduce a number of nodes that require reconnection or resynchronization in the event of a loss of power or connectivity to any coordinator of a synchronized wireless network, including not only a root coordinator of the synchronized wireless network, but also a coordinator node of a PAN of the synchronized wireless network. For example, each of such coordinators may coordinate operation of one of the area networks of the synchronized wireless network by the transmission of beacons, e.g., enhanced beacons, that include synchronization, channel hopping, or timeslot (or slotframe) or other information for a communication schedule of their respective area networks.

Other coordinators that are synchronized to a root coordinator may detect a loss of connectivity with the root coordinator, for any reason, upon failing to capture a predetermined number of beacons from the root coordinator at scheduled times or during scheduled intervals. Upon detecting the loss of connectivity, the coordinators may continue to transmit their own beacons as scheduled, e.g., within channels and during timeslots that were previously allocated or reserved for such purposes. The coordinators may then monitor or listen for beacons during any other channels and timeslots that had previously been designated for transmission, reception or other purposes by other nodes of the area networks.

When coordinators capture beacons transmitted by one another, the coordinators may identify which of the coordinators that were previously synchronized with the root coordinator have a hop count of one, thereby signifying that such coordinators were previously directly connected to and synchronized with the root coordinator, and determine channel offsets of each of such coordinators from the captured beacons. The coordinators may then identify which of such coordinators has a lowest channel offset. A single coordinator having a hop count of one and a lowest channel offset is then elected by the other coordinators to serve as a root coordinator for the remaining nodes of the synchronized wireless network, and other nodes (e.g., coordinators and also other devices or systems) may connect to the root coordinator either directly or by way of another coordinator in a most efficient manner.

Similarly, a node of one area network may detect a loss of connectivity with a coordinator of the area network, e.g., a parent to that node, upon failing to capture a predetermined number of beacons from the coordinator at scheduled times or during scheduled intervals. The node may then disregard a communication schedule previously established by the coordinator, and attempt to monitor or listen for beacons transmitted by a root coordinator of the cross-PAN synchronization network of which the area network is a part, or by other coordinators of other area networks of the cross-PAN synchronization network. Upon detecting one or more of such beacons, the node may then select one of the other area networks and request to join that area network by synchronizing with the coordinator of that area network, and operating in accordance with a communication schedule identified in the beacon received from that coordinator. The node may select one of the area networks based on a number of nodes connected to the coordinator, signal strengths of transmissions received from the coordinator, or on any other basis.

Referring to FIGS. 1A through 1I, views of aspects of one system for maintaining area networks in accordance with implementations of the present disclosure are shown. As is shown in FIG. 1A, a root coordinator (or a root coordinator node, or a root gateway node) 120-1 of a synchronized wireless network 100 is connected to and configured to communicate wirelessly with a plurality of other coordinators (or coordinator nodes, or gateway nodes) 120-2, 120-4, 120-6. The root coordinator 120-1 may generate a communication schedule for the synchronized wireless network 100 that synchronizes communication between or among devices, and to promulgate that communication schedule to the coordinators 120-2, 120-4, 120-6 by the transmission of one or more beacons. Nodes of the synchronized wireless network 100 may communicate according to the IEEE 802.15.4 family of protocols, standards or specifications, or according to any other protocols, standards or specifications.

Each of the other coordinators 120-2, 120-4, 120-6 may be coordinators of one of a plurality of area networks 105-1, 105-2, 105-3, 105-4, e.g., PANs, or any other networks or area networks. Each of the other coordinators 120-2, 120-4, 120-6 may monitor one or more channels designated for the transmission of one or more signals in a communication schedule generated by the root coordinator 120-1. Each of the other coordinators 120-2, 120-4, 120-6 may further generate a communication schedule for synchronizing communication between or among devices of the respective area networks 105-1, 105-2, 105-3, 105-4, and promulgate that communication schedule to devices of the respective area networks 105-1, 105-2, 105-3, 105-4 by the transmission of one or more beacons.

For example, as is shown in FIG. 1A, the coordinator 120-2 is a coordinator of an area network 105-1 that includes at least a pair of sensors (e.g., cameras) 110-1, 110-2 and another coordinator 120-3. Alternatively, the area network

105-1 may include any number of other devices (not shown). The coordinator 120-4 is a coordinator of an area network 105-2 that includes at least a pair of sensors 110-3, 110-4 (e.g., cameras or other devices). The coordinator 120-5 is a coordinator of an area network 105-3 that includes at least a sensor 110-5 (e.g., a camera or another device). The coordinator 120-6 is a coordinator of an area network 105-4 that includes at least a pair of sensors (e.g., cameras or other devices) 110-6, 110-7.

Additionally, nodes or other components that are connected to the area networks 105-1, 105-2, 105-3, 105-4 may be homogenous in nature, such that each of the nodes or other components may have one or more attributes or features in common with any number of other nodes or components connected to the area networks 105-1, 105-2, 105-3, 105-4. Alternatively, nodes or other components that are connected to the area networks 105-1, 105-2, 105-3, 105-4 may be heterogeneous in nature, and need not have any attributes or features in common with any number of the other nodes or components connected to the area networks 105-1, 105-2, 105-3, 105-4.

As is shown in FIG. 1A, each of the sensors 110-1, 110-2, 110-3, 110-4, 110-5, 110-6, 110-7 is a camera or another imaging device configured to capture, process and/or store imaging data (e.g., visual images, depth images, or any other type of images) and, in some implementations, audio signals corresponding to the imaging data. The sensors 110-1, 110-2, 110-3, 110-4, 110-5, 110-6, 110-7 may be further configured to transmit imaging data to the one or more of the coordinators 120-2, 120-4, 120-5, 120-6, or to one or more monitors, stations or data stores (not shown) over one or more networks, e.g., by wired or wireless technologies or protocols. Alternatively, each of the sensors 110-1, 110-2, 110-3, 110-4, 110-5, 110-6, 110-7 may be configured to process imaging data according to one or more algorithms, methods or techniques (e.g., a machine learning model or tool), and to transfer information or data regarding the imaging data to one or more of the coordinators 120-2, 120-4, 120-5, 120-6.

Alternatively, or additionally, in some implementations, the area networks 105-1, 105-2, 105-3, 105-4 may include one or more load sensors that are configured for sensing normal loads (e.g., vertical loads) on a surface at discrete points, and may include one or more capacitive sensors, force-sensing resistors, strain gages, load cells, piezoelectric sensors, inductive weight sensors, or any other type or form of device or system for sensing a load thereon. Signals generated by such load sensors may be interpreted to detect changes or variations in loading on a surface, and to determine a number of items, a type of the items, or a mass of one or more of the items, that are placed on or removed from the surface due to such changes or variations in loading. Such devices or systems may also include one or more circuits or other components, and may be configured for communication by wired or wireless technologies or protocols. In some implementations, such devices or systems may be configured to generate and transmit signals corresponding to loads sensed thereby at designated intervals, e.g., in one or more pulses rather than continuously, in order to reduce power or processing capacity consumed during operation. Additionally, in some implementations, such devices or systems may be self-powered, e.g., with one or more batteries or power sources provided therein.

Alternatively, or additionally, in some implementations, one or more of the area networks 105-1, 105-2, 105-3, 105-4 may include devices or systems having interactive displays, e.g., electronic shelf labels, that may be mounted in association with one or more shelves or other loading stations, and configured to display information regarding one or more products that are placed thereon, or designated for placement thereon. Such devices or systems may include one or more displays or other types or forms of systems for electronically displaying information, including but not limited to an electronic ink display, a liquid crystal display (or "LCD"), a light-emitting diode (or "LED") display, or an organic light-emitting diode (or "OLED") display. Such devices may be further configured to communicate over one or more networks, e.g., by wired or wireless technologies or protocols.

Figure 1B:
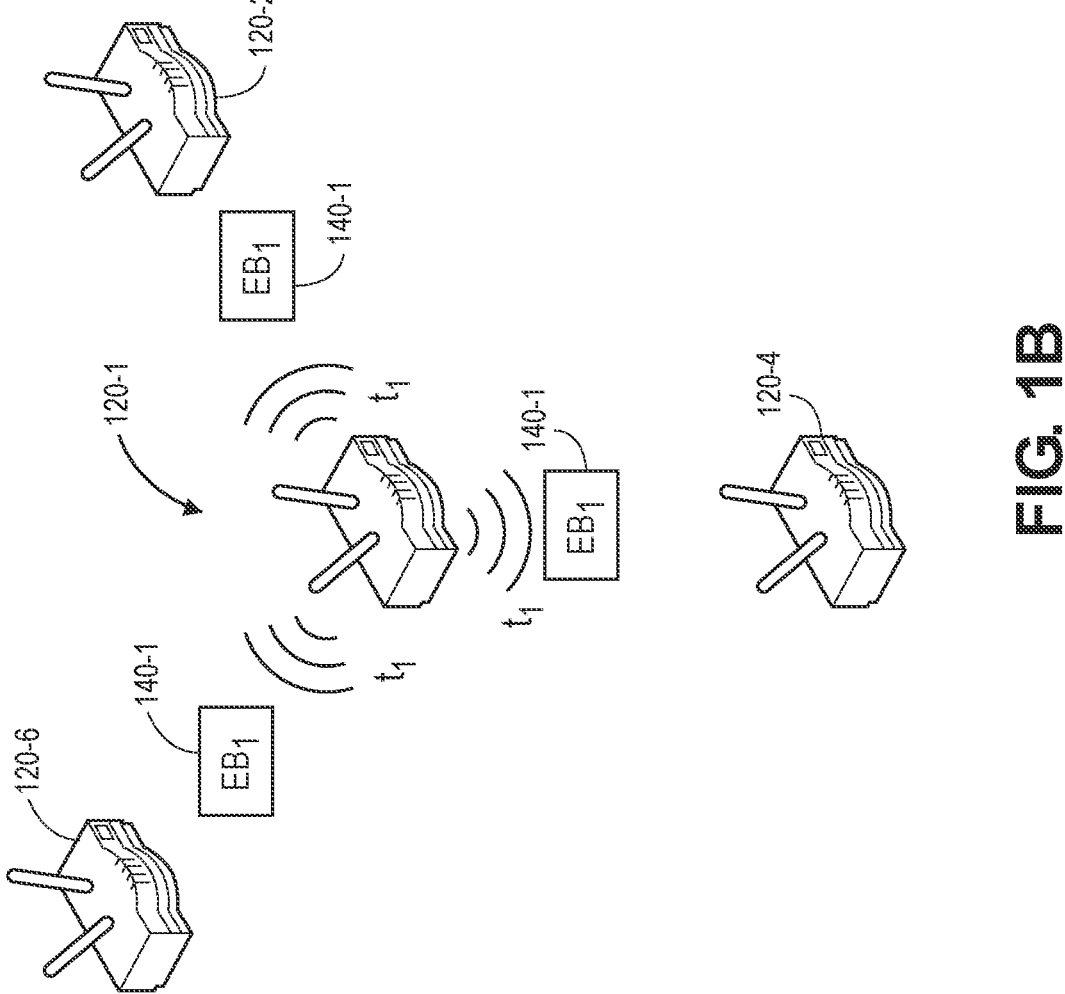

As is shown in FIG. 1B, the root coordinator 120-1 generates and transmits a beacon 140-1, e.g., an enhanced beacon, or $EB_1$, at a time $t_1$, in accordance with a channel offset and within a timeslot within a slotframe of a communication schedule (e.g., a channel-hopping schedule) established by the root coordinator 120-1. The beacon 140-1 may be captured by the coordinators 120-2, 120-4, 120-6 of the area networks 105-1, 105-2, 105-3, 105-4 or devices or systems that are connected thereto, or any other devices or systems (not shown). The beacon 140-1 may include any information (e.g., any number of information elements) regarding synchronization, channel hopping, or timeslots that are available or scheduled to be utilized by the root coordinator 120-1 and the coordinators 120-2, 120-4, 120-6, including but not limited to information regarding the communication schedule. The timeslot during which the beacon 140-1 is transmitted may have any duration, such as fifteen milliseconds (15 ms) or any other duration. Additionally, the timeslot of the communication schedule may include any number of channels or channel offsets, such as eight (8), sixteen (16), thirty-two (32), or sixty-four (64), or any other number of channels.

The beacon 140-1 may be transmitted by the root coordinator 120-1 in accordance with the communication schedule. Contents of the beacon 140-1 may be interpreted by the coordinators 120-2, 120-4, 120-6, which may process the beacon 140-1 to identify timeslots of a slotframe that are available for communication by the coordinators 120-2, 120-4, 120-6 or devices of the respective area networks 105-1, 105-2, 105-3, 105-4, e.g., for transmitting or receiving information or data, and timeslots of the slotframe during which the coordinators 120-2, 120-4, 120-6 may expect to receive information or data from the coordinator 120-1, including but not limited to one or more other beacons that may include information regarding the communication schedule, or revisions to the communication schedule.

The beacon 140-1 may also advertise the synchronized wireless network 100 or the communication schedule to devices that not associated or synchronized with any of the area networks 105-1, 105-2, 105-3, 105-4, such as any number of unconnected sensors or other devices (not shown).

Figure 1C:
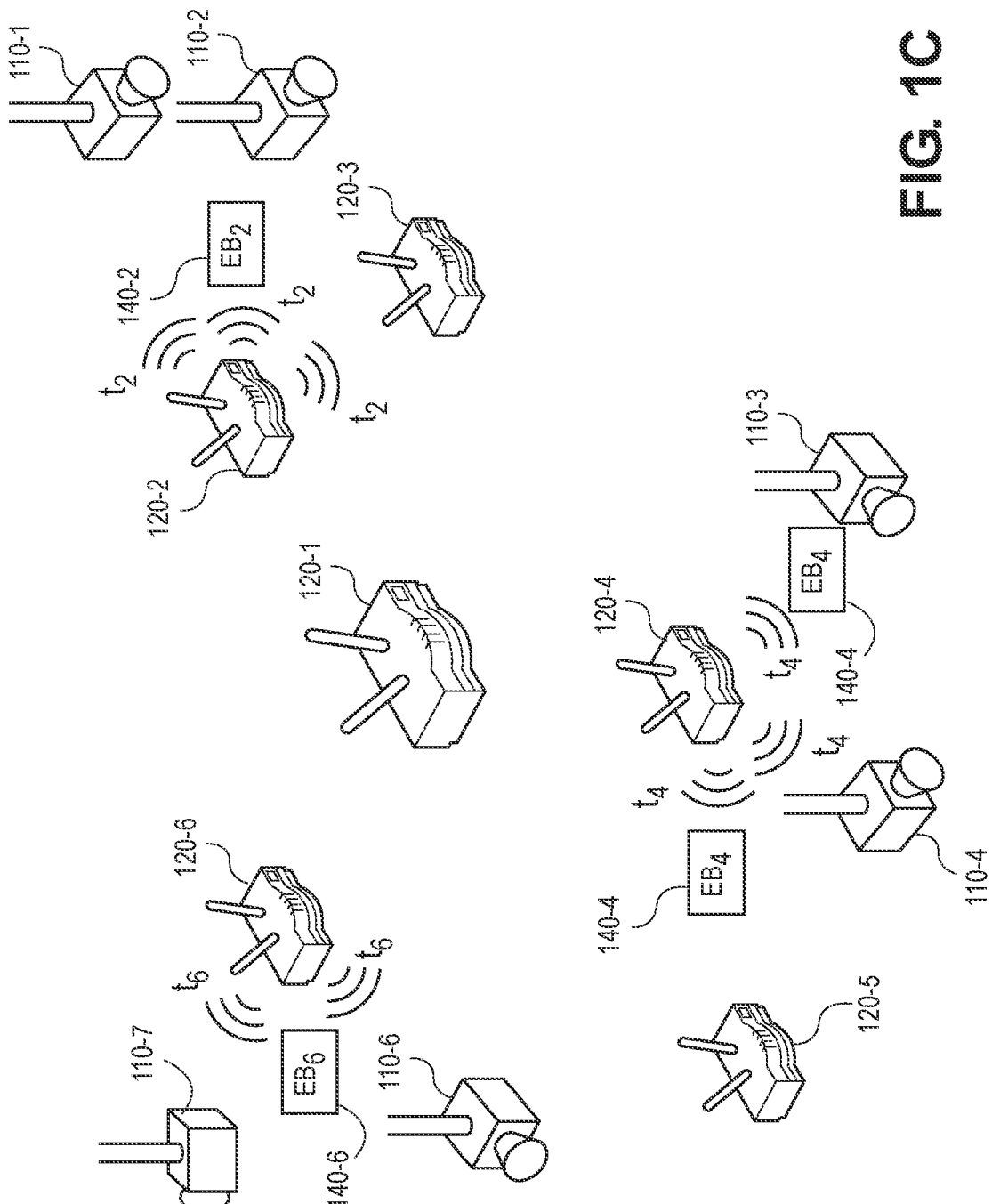

As is shown in FIG. 1C, the coordinators 120-2, 120-4, 120-6 generate and transmit beacons 140-2, 140-4, 140-6, e.g., enhanced beacons, or $EB_2$, $EB_4$, $EB_6$, at times $t_2$, $t_4$, $t_6$ in accordance with respective channel offsets and during respective timeslots within a slotframe of the communication schedule established by the root coordinator 120-1. The beacons 140-2, 140-4, 140-6 may be captured by devices or systems of the respective area networks 105-1, 105-2, 105-4, and may include any information (e.g., any number of information elements) regarding synchronization, channel hopping, or timeslots of a slotframe that are available or scheduled to be utilized by devices or systems of the respective area networks 105-1, 105-2, 105-4, including but not limited to information regarding communication schedules (e.g., channel-hopping schedules) for the respective area networks 105-1, 105-2, 105-4. Alternatively, the beacons 140-2, 140-4, 140-6 may be captured by any other devices or systems (not shown) that are joining the synchronized wireless network 100. Upon receiving any of the beacons 140-2, 140-4, 140-6, a device or system may synchronize with one of the area networks 105-1, 105-2, 105-4, join the synchronized wireless network 100 accordingly, and operate in accordance with a communication schedule identified in a respective one of the beacons 140-2, 140-4, 140-6. The device or system may then communicate with other nodes of the one of the area networks 105-1, 105-2, 105-4 through one or more scheduled slotframes, and become a synchronizer that continuously advertises the one of the area networks 105-1, 105-2, 105-4 to any number of unconnected devices or systems (not shown) by transmitting the beacons 140-2, 140-4, 140-6.

Figure 1D:
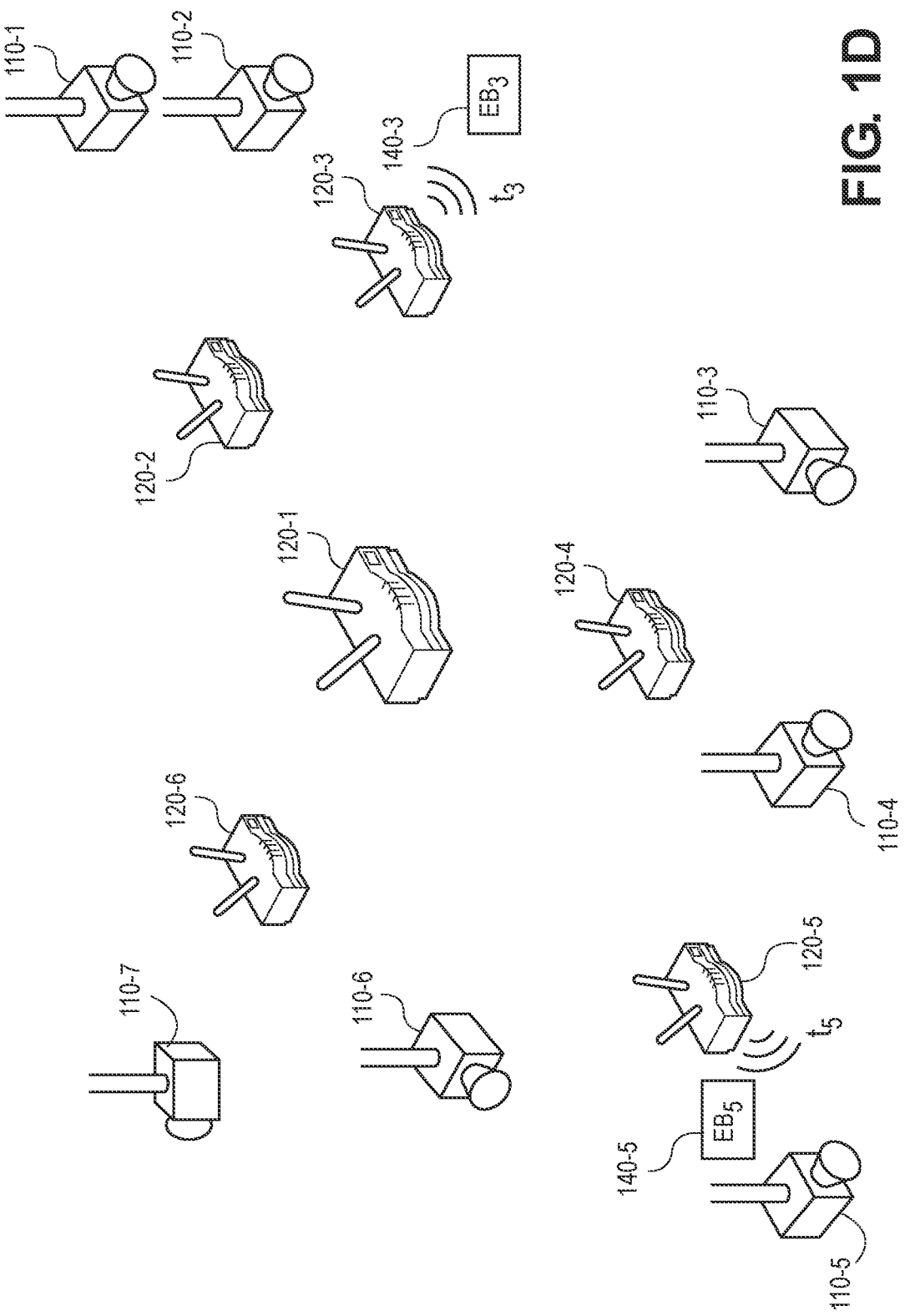

Likewise, as is shown in FIG. 1D, the coordinators 120-3, 120-5 generate and transmit beacons 140-3, 140-5, e.g., enhanced beacons, or $EB_3$, $EB_5$ at times $t_3$, $t_5$ in accordance with respective channel offsets and during respective timeslots within a slotframe of the communication schedule established by the root coordinator 120-1. The beacon 140-3 may advertise the coordinator 120-3 to any devices or systems that intend or attempt to join the synchronized wireless network 100, and are not currently synchronized with any of the area networks 105-1, 105-2, 105-3, 105-4. The beacon 140-3 may include any information (e.g., any number of information elements) regarding synchronization, channel hopping, or timeslots of a slotframe that are available or scheduled to be utilized by devices or systems of the respective area networks 105-3, including but not limited to information regarding communication schedules (e.g., channel-hopping schedules) for an area network to be established by the coordinator 120-3.

The beacon 140-5 may be captured by devices or systems of the area network 105-3, and may include any information (e.g., any number of information elements) regarding synchronization, channel hopping, or timeslots of a slotframe that are available or scheduled to be utilized by devices or systems of the area network 105-3, including but not limited to information regarding communication schedules (e.g., channel-hopping schedules) for the area network 105-3.

Upon receiving either of the beacons 140-3, 140-5, a device or system may synchronize with an area network to be established by the coordinator 120-3 or the area network 105-3, join the synchronized wireless network 100 accordingly, and operate in accordance with a communication schedule identified in a respective one of the beacons 140-3, 140-5. The device or system may then communicate with other nodes of such area networks through one or more scheduled slotframes, and become a synchronizer that continuously advertises the area networks to other nodes by transmitting beacons.

Each of the beacons 140-1, 140-2, 140-3, 140-4, 140-5, 140-6 may include any number of information elements regarding synchronization, channel hopping, or timeslots of a slotframe that are utilized by the coordinators 120-1, 120-2, 120-3, 120-4, 120-5, 120-6, including but not limited to information elements regarding a communication schedule for the synchronized wireless network 100 or any of the area networks 105-1, 105-2, 105-3, 105-4 according to a beacon interval, or a superframe having any number of beacon intervals. For example, as is shown in FIG. 1C, a representative beacon 140-i of the beacons 140-1, 140-2, 140-3, 140-4, 140-5, 140-6 may include an information element 145A-i representing a specific identifier of a vendor (or another entity), such that devices or systems that are manufactured by or otherwise associated with the vendor (or entity) and receive the beacon 140-i may elect to join the synchronized wireless network 100 or any of the area networks 105-1, 105-2, 105-3, 105-4 based on the presence of the information element 145A-i within the beacon 140-i. Additionally, the beacon 140-i may further include an information element 145B-i identifying a length of the beacon 140-i. e.g., a period or a number of timeslots of a slotframe during which a coordinator may transmit frames, such as routing protocol frames or information objects identifying node ranks or priorities within the synchronized wireless network 100 or any of the area networks 105-1, 105-2, 105-3, 105-4.

The beacon 140-i may also include an information element 145C-i representing an identifier of the coordinator that transmitted the beacon 140-i, e.g., a sub-id field. The beacon 140-i may further include an information element 145D-i identifying a synchronization control field, which may include one or more control fields including data regarding operation of an area network represented in a synchronization tree, or multiple area networks that have been synchronized to operate with one another. For example, in some implementations, the information element 145D-i may include a field including one bit for denoting whether a coordinator that transmitted the beacon 140-i is prepared or capable of participating in an area network represented in a synchronization tree, e.g., with one of two binary values indicating that the coordinator that transmitted the beacon 140-i is prepared or capable, or is unprepared or incapable, of participating in the area network. Alternatively, or additionally, the information element 145D-i may further include any number of other data fields regarding the operation of an area network represented in a synchronization tree.

The beacon 140-i may further include an information element 145E-i identifying a channel offset of a coordinator that transmitted the beacon 140-i. The channel offset identified in the information element 145E-i represents a difference between a channel utilized by the coordinator that transmitted the beacon 140-i, and channels operated by any of the other participants in an area network represented in a synchronization tree. The channel offset identified in the information element 145E-i may be selected at random or on any other basis, e.g., by one or more algorithms or techniques.

The beacon 140-i may also include an information element 145F-i identifying a hop count (or a synchronization hop count) of the coordinator that transmitted the beacon 140-i. The hop count represents a number of devices (e.g., coordinators) that the coordinator that transmitted the beacon 140-i is removed from a root coordinator of an area network represented in a synchronization tree, e.g., a synchronized wireless network. For example, a root coordinator of a synchronized wireless network has a hop count of zero, while coordinators that are directly connected to the root coordinator have hop counts of one. Likewise, a hop count of any node connected to the coordinator that transmitted the beacon 140-i is equal to the hop count of that coordinator, plus one. For example, where a coordinator has a hop count of one, a coordinator that is connected to and synchronized with that coordinator has a hop count of two. Alternatively, or additionally, the information element 145F-i, or other information elements of the beacon 140-i, may identify not only the hop count but also loading, speeds, reliability, latencies, or other factors associated with the operation of an area network represented in a synchronization tree.

The beacon 140-i may further include an information element 145G-i identifying a parent offset of the coordinator that transmitted the beacon 140-i. The parent offset is a channel offset of a parent to the coordinator that transmitted the beacon 140-i.

Alternatively, or additionally, the beacon 140-i may further include any number of other information elements, which may identify or represent multicast access periods, contention access periods, loading, epoch times, operating modes, or other attributes or features of the coordinator that transmitted the beacon 140-i. Alternatively, or additionally, the beacon 140-i may also include any number of information elements describing any other attributes or aspects of an enhanced beacon interval, or a superframe including any number of enhanced beacon intervals. Moreover, information regarding a communication schedule may be communicated with nodes of a network in any manner other than by transmission and receipt of beacons.

In accordance with implementations of the present disclosure, coordinators of a synchronized wireless network may detect a loss of connectivity with a root coordinator, or determine that the root coordinator is no longer online, where beacons are not received from the root coordinator as scheduled or anticipated, over a predetermined number of intervals of time, which may be defined by a number of channels, a number of timeslots, and a duration of the timeslots, or for a predetermined period of time.

Figure 1E:
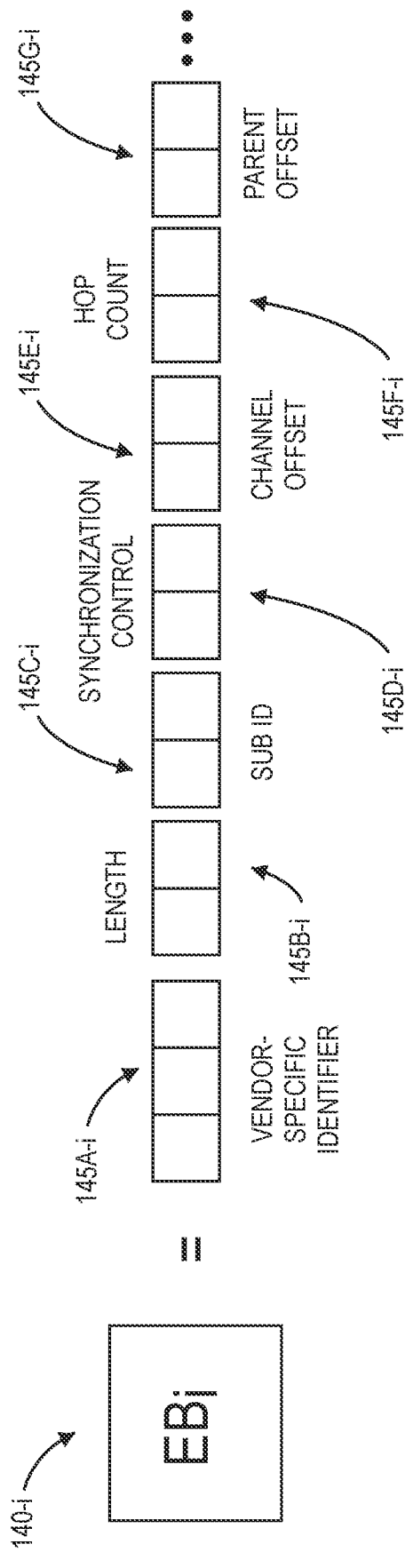
Figure 1F:
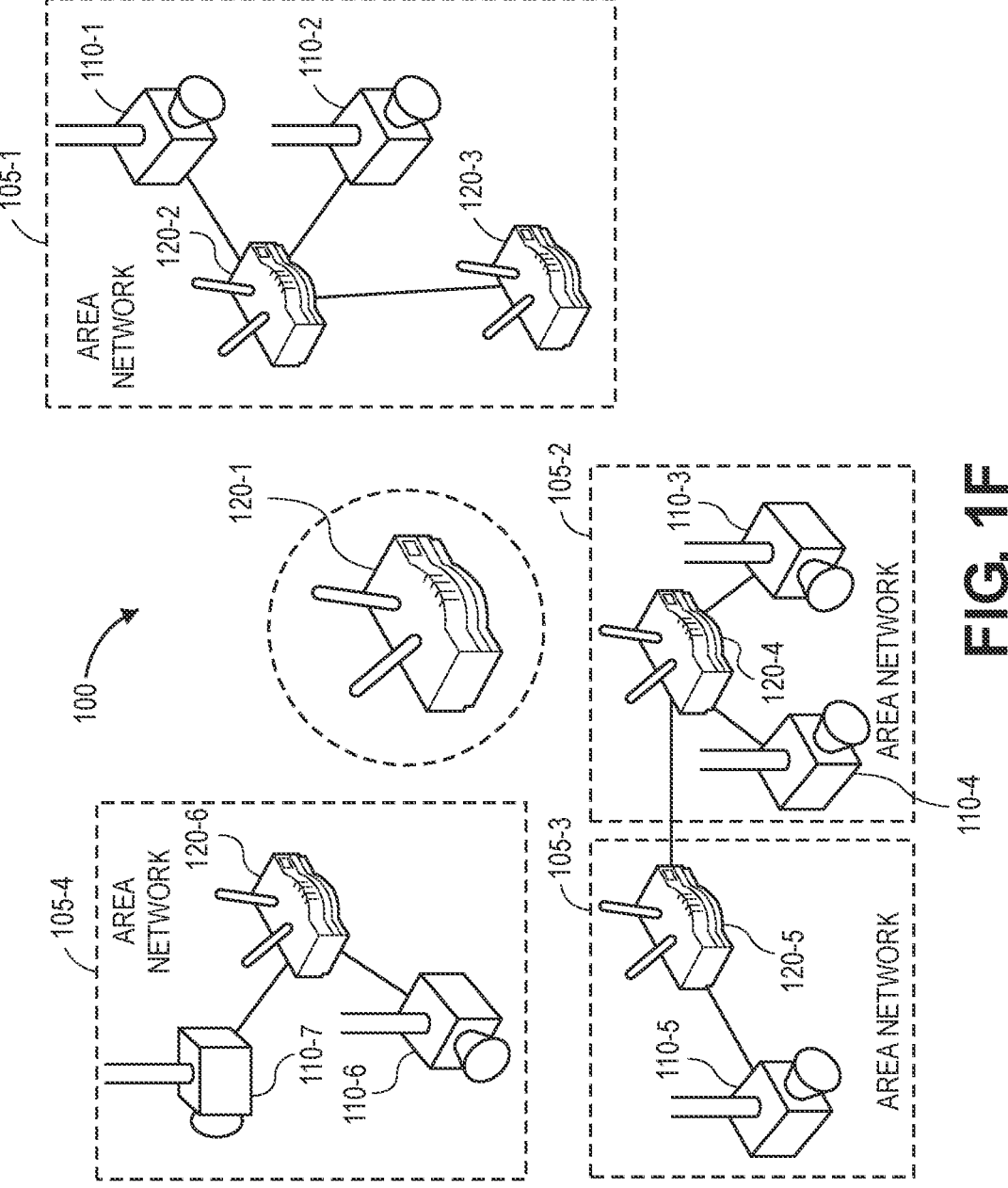

As is shown in FIG. 1F, the coordinators 120-2, 120-3, 120-4, 120-5, 120-6 may detect a loss of connectivity with the root coordinator 120-1 upon failing to receive a beacon for a predetermined number of intervals, or for a predetermined period of time. For example, where the beacon 140-1 identifies one or more timeslots of a communication schedule during which the coordinator 120-1 is scheduled to transmit the beacon 140-1 or other information regarding the communication schedule, and neither the beacon 140-1 nor any other beacon is transmitted during the timeslots for a predetermined number of intervals, e.g., twenty intervals, or any other number of intervals, or for a predetermined period of time, e.g., one second, the coordinators 120-2, 120-3, 120-4, 120-5, 120-6 may determine that connectivity with the root coordinator 120-1 is lost, and that a new root coordinator for the synchronized wireless network 100 must be designated to maintain synchronization.

Figure 1G:
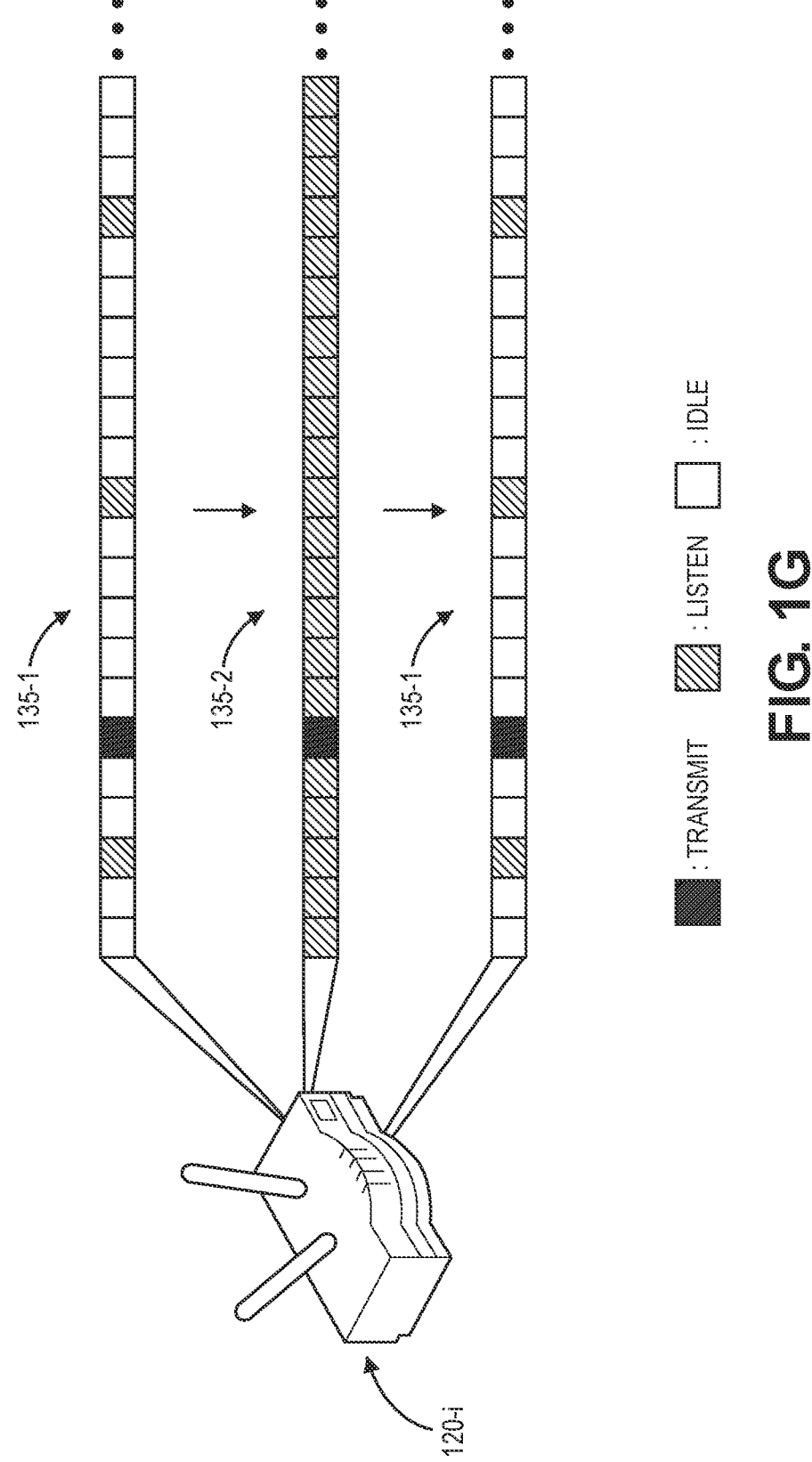

As is shown in FIG. 1G, one row of cells representing timeslots of a single channel of a communication schedule 135-1 is shown. A representative coordinator 120-i is programmed to communicate in accordance with the communication schedule 135-1 based on one or more beacons that the coordinator 120-i received from the root coordinator 120-1. The communication schedule 135-1 may be represented in a slotframe, or a matrix having cells arranged in a number of rows, one of which is shown in FIG. 1G, and a number of columns. Each of the rows of a slotframe may correspond to channels (or channel offsets) and each of the columns of the slotframe may correspond to timeslots (or slot offsets). Each of the timeslots of the row of the communication schedule 135-1 shown in FIG. 1G may represent a potential link between the root coordinator 120-1 and any of the coordinators 120-2, 120-3, 120-4, 120-5, 120-6, or any of the devices of the area networks 105-1, 105-2, 105-3, 105-4, within one channel, and is either scheduled or unscheduled.

For example, the communication schedule 135-1 may include cells representing timeslots that are shared for communication by the coordinator 120-*i* and any devices of the synchronized wireless network 100, e.g., in a common (e.g., shared) channel and timeslot. The communication schedule 135-1 may also include any number of cells representing timeslots that are dedicated for communication between any two devices of the synchronized wireless network 100, e.g., in a dedicated channel and timeslot. The timeslots of shared cells or dedicated cells of the communication schedule 135-1 may be selected in any manner, e.g., randomly or pseudo-randomly, in a hopping sequence. The communication schedule 135-1 may further include any number of cells representing timeslots that are unscheduled, viz., designated neither as shared nor dedicated, during which the coordinator 120-*i* may remain idle.

The timeslots of the communication schedule 135-1 may have any duration or width, and may be provided within a channel at any frequency. For example, in some implementations, the channels of the communication schedule 135-1 may be provided within a band centered around a frequency within a frequency range between approximately nine hundred megahertz and approximately nine hundred fifty megahertz (900-950 MHZ), such as between approximately nine hundred two megahertz and approximately nine hundred twenty-eight megahertz (902-928 MHZ). In some other implementations, the channels of the communication schedule 135-1 may be provided within a band centered around a frequency within a frequency range between approximately eight hundred fifty megahertz and approximately eight hundred seventy-five megahertz (850-875 MHZ), such as between approximately eight hundred sixty-three megahertz and approximately eight hundred seventy megahertz (863-870 MHZ). In some implementations, the channels of the communication schedule 135-1 may be provided within a band centered around a frequency of approximately 2.4 gigahertz (GHz). Moreover, in some implementations, each of the timeslots may have a duration of approximately fifteen milliseconds (15 ms). Although only a single row of timeslots of the communication schedule 135-1 is shown in FIG. 1G, a slotframe may include any number of channels, each including a plurality of timeslots within the respective channels.

As is also shown in FIG. 1G, in response to determining that connectivity with the root coordinator 120-1 is lost, the coordinator 120-*i* operates pursuant to a communication schedule 135-2 according to which the coordinator 120-*i* continues to transmit beacons within a channel and timeslots of a slotframe that were previously designated for such purposes, e.g., a shared or dedicated timeslot. Additionally, pursuant to the communication schedule 135-2, all other timeslots of the slotframe are designated for receiving (or monitoring or listening) for transmissions of signals by any other coordinators, e.g., one or more of the coordinators 120-2, 120-3, 120-4, 120-5, 120-6. Rather than monitoring for transmissions of signals according to the communication schedule 135-1, which may include sets of cells for shared or dedicated communication having durations defined by numbers of such timeslots, the coordinator 120-*i* monitors or listens during all individual timeslots within every channel of the communication schedule 135-1 to determine whether any coordinators have transmitted any beacons during any of such timeslots. Alternatively, or additionally, the coordinator 120-*i* has monitored each of the channels and timeslots of multiple slotframes, e.g., a superframe.

As is further shown in FIG. 1G, after the coordinator 120-*i* has monitored each of the timeslots of the slotframe according to the communication schedule 135-2, the coordinator 120-*i* reverts to the communication schedule 135-1, and either transmits signals, receives signals, or remains idle for the various timeslots.

Figure 1H:
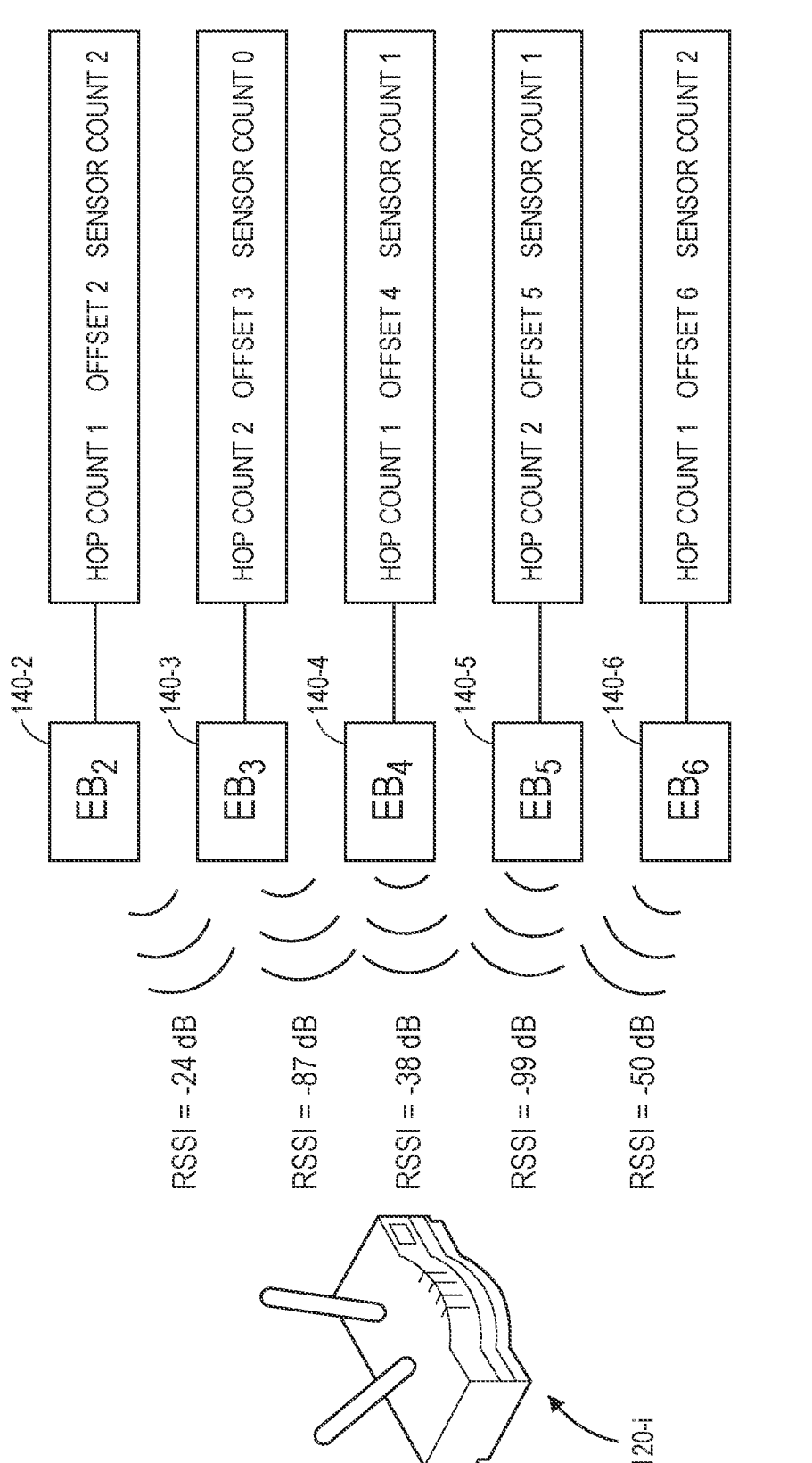
Figure 11:
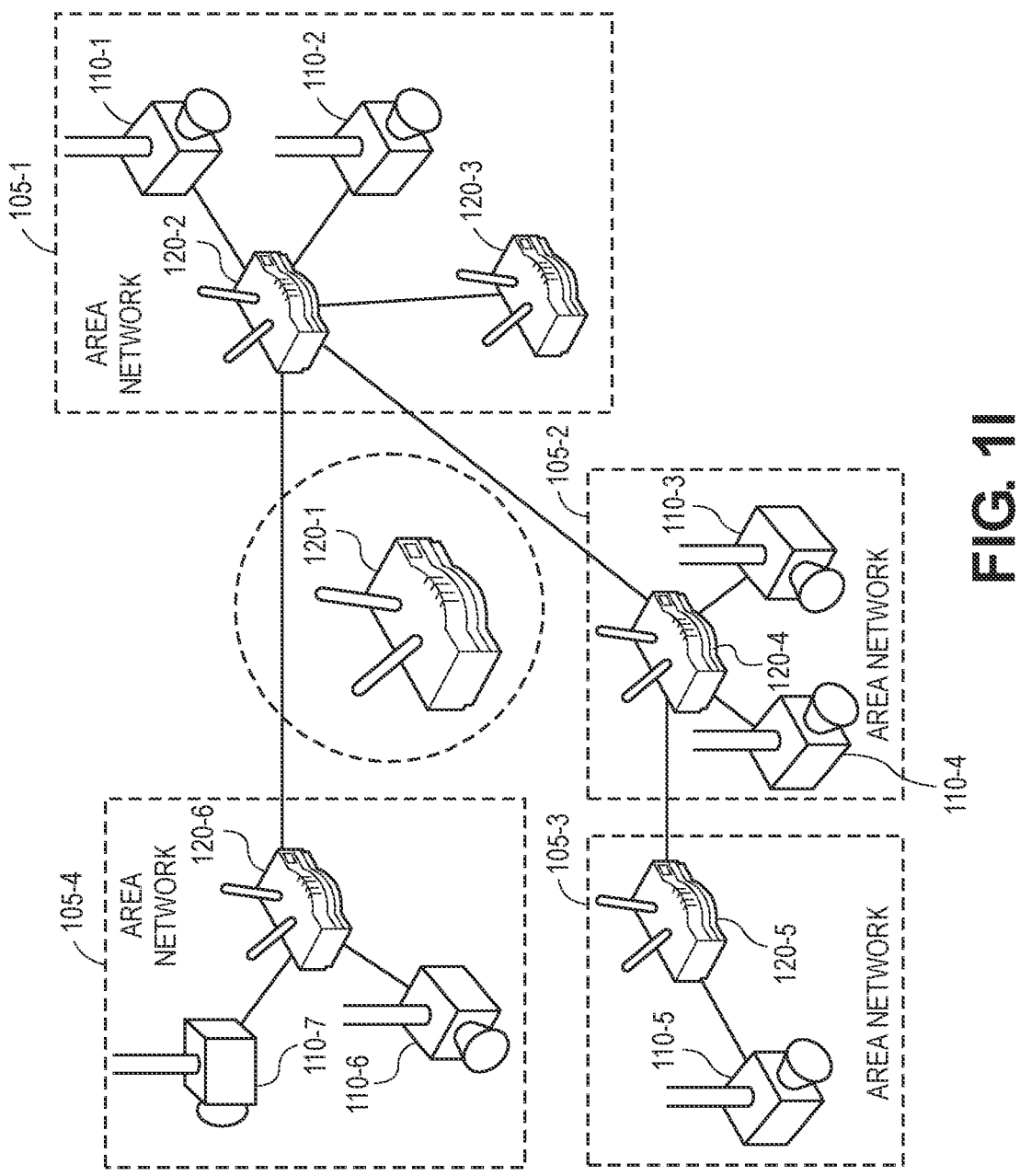

As is shown in FIG. 1H, the coordinator 120-*i* of FIG. 1G receives beacons 140-2, 140-3, 140-4, 140-5, 140-6 during timeslots of the communication schedule 135-2 shown in FIG. 1G. The beacons 140-2, 140-3, 140-4, 140-5, 140-6 were transmitted by each of the coordinators 120-2, 120-3, 120-4, 120-5, 120-6 and include information regarding the respective coordinators, as well as any respective area networks coordinated by the coordinators. For example, each of the beacons 140-2, 140-3, 140-4, 140-5, 140-6 of FIG. 1H may include an information element identifying a channel offset of a coordinator that transmitted the beacons 140-2, 140-3, 140-4, 140-5, 140-6, e.g., a difference between a channel utilized by the coordinator, and channels operated by any of coordinators or nodes of the synchronized wireless network 100. Channel offsets identified in the beacons 140-2, 140-3, 140-4, 140-5, 140-6 may be selected at random or on any other basis, e.g., by one or more algorithms or techniques.

Additionally, each of the beacons 140-2, 140-3, 140-4, 140-5, 140-6 of FIG. 1H may include an information element identifying a hop count (or a synchronization hop count) of a coordinator that transmitted the beacons 140-2, 140-3, 140-4, 140-5, 140-6. The hop count represents a number of devices that the coordinator that transmitted the beacons 140-2, 140-3, 140-4, 140-5, 140-6 is removed from the root coordinator 120-1. A hop count of any node connected to one of the coordinators that transmitted the beacons 140-2, 140-3, 140-4, 140-5, 140-6 is equal to the hop count of that coordinator, plus one. Alternatively, or additionally, information elements of the beacons 140-2, 140-3, 140-4, 140-5, 140-6, may identify not only the hop count but also loading, speeds, reliability, latencies, or other factors associated with the operation of an area network represented in a synchronization tree.

Each of the beacons 140-2, 140-3, 140-4, 140-5, 140-6 of FIG. 1H may further include an information element identifying a channel offset of the coordinator that transmitted the one of the beacons 140-2, 140-3, 140-4, 140-5, 140-6. Alternatively, each of the beacons 140-2, 140-3, 140-4, 140-5, 140-6 of FIG. 1H may further identify a parent offset of the coordinator, viz., a channel offset of a parent to the coordinator that transmitted the beacons 140-2, 140-3, 140-4, 140-5, 140-6. Each of the beacons 140-2, 140-3, 140-4, 140-5, 140-6 of FIG. 1H may also identify a number of devices or systems, e.g., sensors, connected to the coordinator (or a "sensor count").

Alternatively, or additionally, the beacons 140-2, 140-3, 140-4, 140-5, 140-6 may further include any number of other information elements, which may identify or represent multicast access periods, contention access periods, loading, epoch times, operating modes, or other attributes or features of the coordinator that transmitted the beacons 140-2, 140-3, 140-4, 140-5, 140-6. Alternatively, or additionally, the beacons 140-2, 140-3, 140-4, 140-5, 140-6 may also include any number of information elements describing any other attributes or aspects of an enhanced beacon interval, or a superframe including any number of enhanced beacon intervals. Information regarding a communication schedule may be communicated with nodes of a network in any manner other than by transmission and receipt of beacons.

Furthermore, upon receiving the beacons 140-2, 140-3, 140-4, 140-5, 140-6, the coordinator 120-*i* may calculate or otherwise determine signal strengths of such beacons, or received signal strength indicators (or "RSSI") of transmissions including such beacons, or otherwise determine strengths of signals of such transmissions in any other manner. A signal strength may be determined as a multi-bit value representing a level of power, e.g., a number of decibels per milliwatt (or "dBm"), received in the incoming signals, or in any other manner, and may be determined at any interval, e.g., every two milliseconds, or at any other interval. Alternatively, or in addition to signal strength, a level of quality of a link to each of the coordinators that transmitted the respective signals, or the beacons contained therein, may be determined based on an energy detection level, a signal-to-noise ratio, or in any other manner.

For example, as is shown in FIG. 1H, the beacon 140-2 indicates that the coordinator 120-2 has a hop count of one and an offset of two, and is connected to two sensors, while the beacon 140-3 indicates that the coordinator 120-3 has a hop count of two and an offset of three, and is not connected to any other nodes, and the beacon 140-4 indicates that the coordinator 120-4 has a hop count of one and an offset of four, and is connected to one node. The beacon 140-5 indicates that the coordinator 120-5 has a hop count of two and an offset of five, and is connected to one node, while beacon 140-6 indicates that the coordinator 120-6 has a hop count of one and an offset of six, and is connected to two nodes. Additionally, the coordinator 120-i may process signals including the beacons 140-2, 140-3, 140-4, 140-5, 140-6, and determine that each of such signals was transmitted with an RSSI of −24 decibels, −87 decibels, −38 decibels, −99 decibels and −50 decibels, respectively.

Moreover, upon receiving the beacons 140-2, 140-3, 140-4, 140-5, 140-6, the coordinator 120-i may also determine a number of nodes connected to the synchronized wireless network 100 as a whole, or to each area network, based on a number of beacons received by the coordinator 120-i, and numbers of devices or systems connected to the coordinator, e.g., "sensor counts."

As is shown in FIG. 1I, in response to the loss of connectivity with the root coordinator 120-1, the coordinators 120-2, 120-3, 120-4, 120-5, 120-6 may elect one of themselves, viz., the coordinator 120-2, to serve as a new root coordinator for the synchronized wireless network 100. In some implementations, the coordinator 120-2 may be one of the coordinators having a hop count of 1, viz., the coordinators 120-2, 120-4, 120-6, and also a lowest channel offset, as determined from the beacons 140-2, 140-3, 140-4, 140-5, 140-6. In some implementations, the coordinator 120-2 may be elected based on a number of nodes connected to the coordinator 120-2, or signal strengths of transmissions received by the coordinator 120-2.

After having been elected as a root coordinator, the coordinator 120-2 may then generate a communication schedule for the synchronized wireless network 100 that synchronizes communication between or among devices and promulgates that communication schedule to the coordinators 120-2, 120-5, 120-6 or the camera 110-3 by the transmission of one or more beacons.

Subsequently, the other coordinators 120-3, 120-4, 120-5, 120-6 may connect to and synchronize with the root coordinator 120-2 directly or, alternatively, indirectly in any other manner and on any other basis. For example, other coordinators may elect to connect with the root coordinator 120-2 or with other coordinators connected to the root coordinator 120-2 based on numbers of nodes connected to such other coordinators, or signal strengths of transmissions received by such other coordinators, or on any other basis.

In some implementations, nodes (e.g., coordinators, devices, sensors, or others) described herein may be equipped with one or more processors, components, transceivers, sensors or other systems for engaging in communications with other nodes, and with any other external computer devices via one or more other networks. For example, nodes may each include any number of transceivers or other systems for communicating via any wired or wireless protocols, standards or specifications, including but not limited to Wireless Fidelity ("Wi-Fi"), near-field communication (or "NFC"), Bluetooth®, or any other type of protocols, standards or specifications.

In some implementations, each of the devices of an area network, e.g., a PAN, may be configured to operate according to the IEEE 802.15.4 family of protocols, standards or specifications. Additionally, nodes (e.g., coordinator nodes, or leaf nodes) that are connected to area networks may be homogenous or heterogeneous in nature, such that each of the nodes of an area network may have one or more attributes or features in common with any number of other nodes of the area network, or need not have any attributes or features in common with any number of the other nodes.

Time-slotted channel hopping, or TSCH, is a medium access control technique that relies on time synchronization to achieve low power operations and channel hopping for enhanced reliability. When an area network operates based on TSCH, activities of each node in the area network are controlled according to a time-slotted schedule in which time is carved into timeslots (or slot offsets) that are grouped into slotframes that repeat over time, and in which frequencies are divided into channels (or channel offsets). The schedule may be represented as a matrix or another set of cells, with each of the cells lying at an intersection of one timeslot and one channel.

Each of the timeslots is sufficiently long to accommodate a transmission of data and also a receipt of an acknowledgement, as well as encryption or decryption of the data, where necessary. The timeslots may have any duration or width. In some implementations, each of the timeslots may have a duration of approximately fifteen milliseconds (15 ms). Moreover, each of the timeslots is further identified with respect to a slot offset, e.g., an interval of time within a slotframe when the timeslot occurs, as well as a channel offset, e.g., an identification of a frequency for communication. A size of a slotframe is defined by a number of timeslots included therein. In some implementations, a slotframe may include approximately sixty to seventy timeslots. Timeslots may be dedicated to a single node or shared by two or more nodes. The channel hopping nature of a communication schedule in TSCH permits the same timeslot in a slotframe to be utilized for the transfer of data at a different frequency in each iteration of the slotframe.

Nodes of area networks may be configured to communicate within channels that have any range of frequencies. In some implementations, the channels may be provided within a band centered around a frequency within a range of frequencies between approximately nine hundred megahertz and approximately nine hundred fifty megahertz (900-950 MHZ), between approximately nine hundred two megahertz and approximately nine hundred twenty-eight megahertz (902-928 MHZ), between approximately eight hundred fifty megahertz and approximately eight hundred seventy-five megahertz (850-875 MHZ), or between approximately eight hundred sixty-three megahertz and approximately eight hundred seventy megahertz (863-870 MHz). In some other implementations, the channels may be provided within a band centered around a frequency of approximately 2.4 gigahertz (GHz).

An area network, such as a PAN, is formed when a node, e.g., a coordinator node, or a gateway node, transmits a beacon (or a beacon frame) of information in a process known as advertising. The beacon may include any information regarding synchronization, channel hopping, or timeslots that are utilized by the area network being advertised. Other nodes that intend to connect with the coordinator may actively or passively scan one or more of a predetermined set of channels over a period of time in order to determine whether any beacons are being transmitted by nodes (e.g., the coordinator, or synchronizers) within such channels. Upon receiving a beacon transmitted by a node of an area network, the node may request to join the area network by synchronizing with one or more nodes of the area network, and operating in accordance with a communication schedule identified in the beacon. Once a node joins an area network, the node may communicate with other nodes of the network through one or more scheduled slotframes, and becomes a synchronizer that continuously advertises the area network to other nodes by transmitting beacons.

The nodes (or devices) of the present disclosure may be mounted on walls, ceilings, roofs or other surfaces or structures of any type or form of facility, e.g., in locations where such nodes may remain in an operational range or communications range of one or more other nodes. For example, one or more nodes may be provided in association with any working area or environment, building, region, structure or other space (e.g., covered or uncovered) where access to one or more networks may be desired, such as a business-related structure such as an office, a shopping center, a restaurant (e.g., a coffee shop), a materials handling facility, a post office, a grocery store, a department store, or any other defined or undefined structure having one or more commercial areas. Alternatively, one or more nodes may be provided in association with a home of any type, kind, shape or form (e.g., a house, an apartment, a condominium, a dormitory, or any other defined or undefined structure having one or more living spaces), as well as indoor or outdoor forums or facilities such as stadiums, ballfields, parks (or other open spaces), transportation centers or financial institutions (e.g., banks).

Furthermore, a node may be configured to connect with any number of networks (e.g., the Internet) by any wired or wireless connections, and in accordance with any protocols, standards or specifications. For example, in some implementations, a node may be configured to communicate by way of any Institute of Electrical and Electronics Engineers (or "IEEE") standards, including but not limited to any of the IEEE 802 family of protocols, standards or specifications, and more specifically any of the IEEE 802.15 protocols, standards or specifications, viz., the IEEE 802.15.4 protocol.

Nodes of any other type or form may synchronize with other nodes to form area networks in such working areas or environments. Such other nodes may include any type or form of device, such as any number of sensors, cameras, load sensors, acoustic sensors (e.g., microphones), or any other sensors, as well as general-purpose or special-purpose machines such as personal computing devices (e.g., desktop computers, laptop computers, mobile devices, smartphones, tablets or smart speakers), as well as appliances or systems such as televisions, set-top boxes, audio or video equipment, refrigerators, ovens, telephones, garage door openers, security systems, lights, switches, locks, or others.

Figure 2:
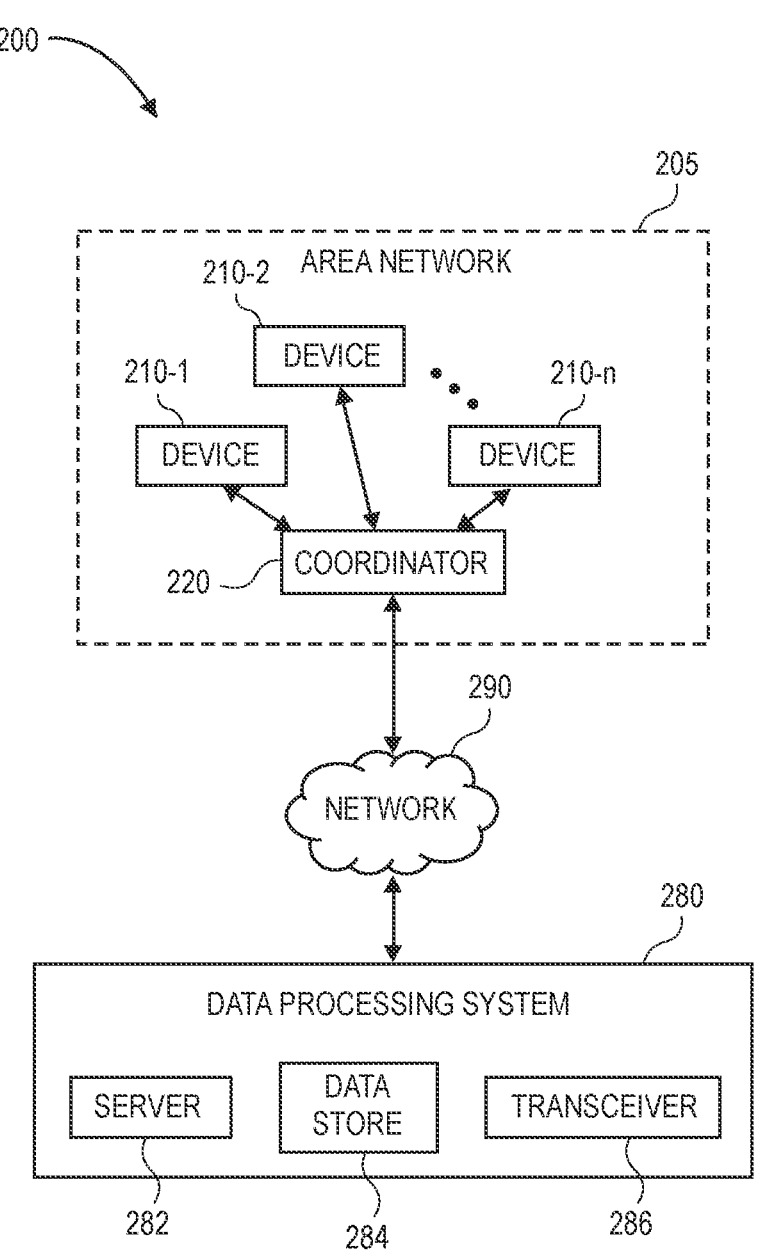
FIG. 2 is a block diagram of one system for maintaining area networks in accordance with implementations of the present disclosure.

Referring to FIG. 2, block diagrams of one system 200 for maintaining area networks in accordance with implementations of the present disclosure are shown. The system 200 includes an area network (e.g., a personal area network, or PAN) 205 and an external network 290. The area network 205 includes a plurality of devices 210-1, 210-2 . . . 210-n and a coordinator (e.g., a coordinator node, or a gateway node) 220. Except where otherwise noted, reference numerals preceded by the number "2" in FIG. 2 refer to elements that are similar to elements having reference numerals preceded by the number "1" shown in FIGS. 1A through 1I.

The coordinator 220 is configured to associate with any or all of the devices 210-1, 210-2 . . . 210-n, and to enable such devices 210-1, 210-2 . . . 210-n to communicate with one or more external computer devices or systems, e.g., the data processing system 280 or others (not shown), over the external network 290, which may include the Internet in whole or in part.

In some embodiments, the coordinator 220 may be a wireless router, a "hot spot," an antenna system, or any other device or component that is configured to enable communication over the external network 290. The coordinator 220 may include one or more processors, one or more data stores (or memory components), one or more transceivers and one or more antenna modules or any other components. In some implementations, one or more of the components of the coordinator 220 may be provided on a circuit board or card, e.g., a network interface card.

The processors of the coordinator 220 may be configured to execute one or more sets of instructions, which may be stored in one or more data stores or elsewhere, for causing the coordinator 220 to perform any of the functions or operations described herein. In some implementations, the processors of the coordinator 220 may generate communication schedules, or frequency plans, for communication with the area network 205, or other area networks (not shown), including cells that are scheduled or unscheduled and may be defined by channels (or channel offsets) and timeslots (or slot offsets). In some other implementations, the processors of the coordinator 220 may generate beacons, e.g., enhanced beacons, that advertise the area network 205 and include information regarding the communication schedules, as well as information regarding synchronization, channel hopping, or timeslots that are utilized by the area network 205. Alternatively, or additionally, any of the devices 210-1, 210-2 . . . 210-n may likewise generate such beacons or other information.

Additionally, in some implementations, the processors may generate one or more frames of data corresponding to an authentication response or an association response, and cause such frames of data to be transmitted by the transceivers of the coordinator 220, as necessary. In some other implementations, however, the processors may interpret one or more frames of data, which may correspond to an authentication request, or an association request, as necessary.

The transceivers of the coordinator 220 may be configured to enable the coordinator 220 to receive or transmit information or data to or from the data processing system 280, or any other computing device, over the external network 290. For example, the transceivers of the coordinator 220 may be configured to communicate through one or more wired or wireless means, e.g., wired technologies such as Universal Serial Bus (or "USB") or fiber optic cable, or standard wireless protocols, standards or specifications such as Bluetooth® or any Wi-Fi protocol, such as over the external network 290 or directly. The transceivers of the coordinator 220 may also be configured to enable the coordinator 220 to communicate with any of the devices 210-1, 210-2 . . . 210-*n* or any other devices or PANs (not shown), according to any wireless protocols, standards or specifications such as a Bluetooth® or Wi-Fi protocol. For example, the transceivers may be configured to communicate according to the 802.15.4 family of protocols, standards or specifications for communications over one or more networks (e.g., personal area networks). The transceivers may perform any necessary protocol, timing or other data transformations in order to convert data signals from a first format suitable for use by one component into a second format suitable for use by another component. In some implementations, the transceivers may include support for devices attached through various types of peripheral buses, e.g., variants of the Peripheral Component Interconnect ("PCI") bus standard or the Universal Serial Bus ("USB") standard. In some other implementations, functions of the transceivers may be split into two or more separate components, or incorporated directly into the processors. Additionally, the transceivers may be configured to operate or perform any type of encryption and on any basis.

The antenna modules of the coordinator 220 may be one or more components for transmitting or receiving information or data to or from the devices 210-1, 210-2 . . . 210-*n*, or to or from one or more other components or systems, e.g., over the external network 290 or directly. For example, the antenna modules may be configured to transmit one or more signals in any direction (e.g., a single direction or omnidirectional), or receive one or more signals from any direction, and at any frequency range or in accordance with any protocol, standard or specification.

Additionally, the coordinator 220 may further include any type of power source for providing electrical power or other forms of power in support of one or more electrical loads. Such power sources may include, for example, one or more batteries or other power cells, e.g., dry cell or wet cell batteries such as lead-acid batteries, lithium-ion batteries, nickel cadmium batteries or nickel metal hydride batteries, or any other type, size or form of batteries, and may each have any cell voltages, peak load currents, charge times, specific energies, internal resistances or cycle lives, or other power ratings. The coordinator 220 may also include any type, size or form of other power source, e.g., other than a battery, including but not limited to one or more fuel cells or solar cells.

The devices 210-1, 210-2 . . . 210-*n* may be any type or form of sensor (e.g., a camera, a load sensor, or another sensor), computing device (e.g., a smartphone, a tablet computer, a laptop computer, a desktop computer, or computing devices provided in wristwatches, televisions, set-top boxes, automobiles or any other appliances or machines), or any other machine. The processors of the devices 210-1, 210-2 . . . 210-*n* may be configured to execute one or more sets of instructions, which may be stored in the one or more data stores of such devices or elsewhere, for causing such devices to perform any of the functions or operations described herein. For example, in some implementations, the processors may generate one or more frames of data corresponding to an authentication request or an association request, and cause such frames of data to be transmitted to one or more other devices, as necessary. In some other implementations, however, the processors may interpret one or more frames of data, which may correspond to an authentication response, or an association response, as necessary.

The processors of the devices 210-1, 210-2 . . . 210-*n* may be configured to perform any type or form of computing function, including but not limited to the execution of one or more machine learning algorithms or techniques, for controlling any aspects of the operation of the devices 210-1, 210-2 . . . 210-*n* and any computer-based components thereon, e.g., data stores, transceivers, input/output (or "I/O") devices or others. The processors may further control any aspects of the operation of any number of additional components that may be provided on the devices 210-1, 210-2 . . . 210-*n*. e.g., one or more other sensors, illuminators (e.g., lights), or the like. In some embodiments, the processors may be configured to initiate a handshake with the coordinator 220 or any other gateways (not shown) e.g., by exchanging one or more packets of information or data with the coordinator 220. A successfully completed handshake may open up a communications channel between the coordinator 220 and any of the devices 210-1, 210-2 . . . 210-*n*, e.g., in accordance with a communication schedule.

In some embodiments, the processors of the devices 210-1, 210-2 . . . 210-*n* may be configured to determine that a handshake has been accepted or refused by one or more gateways, and to execute one or more actions in response to the acceptance or refusal, e.g., to transfer data according to one or more protocols or standards, such as Transmission Control Protocol (or "TCP"), Transport Layer Security (or "TLS"), Secure Sockets Layer ("or "SSL"), or others.

The processors of the devices 210-1, 210-2 . . . 210-*n* may include a uniprocessor system including one processor, or a multiprocessor system including several processors (e.g., two, four, eight, or another suitable number), and may be capable of executing instructions. For example, in some embodiments, such processors may be a general-purpose or embedded processor implementing any of a number of instruction set architectures (or "ISA"), such as the x86, PowerPC, SPARC, or MIPS ISAs, or any other suitable ISA. Where the processors are components of a multiprocessor system, each of the processors within the multiprocessor system may operate the same ISA, or different ISAs.

The data stores of the devices 210-1, 210-2 . . . 210-*n* may be further configured to store any other data items accessible by or to processors thereof. The data stores may be implemented using any suitable technology, such as static random-access memory (or "SRAM"), synchronous dynamic RAM (or "SDRAM"), nonvolatile/Flash-type memory, or any other type of memory. Information or data stored in the data stores may be generated by one or more of the devices 210-1, 210-2 . . . 210-*n*, or the coordinator 220, or any systems in communication therewith, and transmitted by transmission media or signals, such as electrical, electromagnetic, or digital signals, which may be conveyed via a communication medium such as a wired and/or a wireless link.

The transceivers of the devices 210-1, 210-2 . . . 210-*n* may be configured to transmit and/or receive Wi-Fi signals, Bluetooth® signals, NFC signals, or any other type or form of signals within any frequency spectra or having any intensity or center frequency. The transceivers may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceivers may be of any kind or type, and may be sent over the one or more networks 290 or directly to one or more of the coordinators 220 or any other computer devices or components.

The devices 210-1, 210-2 . . . 210-*n* may include one or more I/O devices, which may be configured to receive and provide information to human users of the devices 210-1, 210-2 . . . 210-*n* and may include, but need not be limited to, a display, (e.g., a touch-screen display), a scanner, a keyboard, a keypad, a biometric scanner, an audio transducer, one or more speakers, one or more imaging devices such as a video camera, and any other types of input or output devices that may support interaction between the devices 210-1, 210-2 . . . 210-*n* and a human operator. The devices 210-1, 210-2 . . . 210-*n* may further include one or more displays or other types or forms of systems for electronically displaying information, including but not limited to an electronic ink display, a liquid crystal display (or "LCD"), a light-emitting diode (or "LED") display, or an organic light-emitting diode (or "OLED") display.

Moreover, in some implementations, the processors of the devices 210-1, 210-2 . . . 210-*n* may also generate beacons, e.g., enhanced beacons, or other information regarding the operation of the area network 205 or any other area networks (not shown), and the transceivers of the devices 210-1, 210-2 . . . 210-*n* may transmit such beacons or other information to the coordinator 220, or one or more other nodes or other devices.

The data processing system 280 includes one or more physical computer servers 282 having one or more computer processors and any number of data stores 284 (e.g., databases) or transceivers 286 associated therewith, as well as provided for any specific or general purpose. For example, the data processing system 280 of FIG. 2 may be independently provided for the exclusive purpose of receiving, analyzing or storing information or data received from any source or, alternatively, provided in connection with one or more physical or virtual services configured to receive, analyze or store such imaging data or other information or data, as well as one or more other functions. The servers 282 may be connected to or otherwise communicate with the data stores 284, which may store any type of information or data, including but not limited to acoustic signals, imaging data, or other information or data, for any purpose. The servers 282 may also connect to or otherwise communicate with the network 290 through the sending and receiving of digital data. For example, the data processing system 280 may include any facilities, stations or locations having the ability or capacity to receive and store information or data, such as media files, from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles.

The transceivers 286 may be configured to enable the data processing system 280 to receive or transmit information or data to or from any of the coordinators 220, or any other computing device, over the network 290. For example, the transceivers 286 may be configured to communicate through one or more wired or wireless means, e.g., wired technologies such as USB or fiber optic cable, or standard wireless protocols, standards or specifications such as Bluetooth® or any Wi-Fi protocol, such as over the network 290 or directly. The transceivers 286 may also be configured to enable the data processing system 280 to communicate with any of the devices 210-1, 210-2 . . . 210-*n* according to any wireless protocols, standards or specifications such as Bluetooth® or Wi-Fi protocol, by way of the coordinator 220.

For example, the transceivers 286 may be configured to communicate according to the 802.15.4 family of protocols, standards or specifications for wireless communications over one or more networks (e.g., personal area networks). The transceivers 286 may perform any necessary protocol, timing or other data transformations in order to convert data signals from a first format suitable for use by one component into a second format suitable for use by another component. For example, in some implementations, the transceivers 286 may include support for devices attached through various types of peripheral buses, e.g., variants of the PCI bus standard or the USB standard. In some other implementations, functions of the transceivers 286 may be split into two or more separate components, or incorporated directly into the server 282. Additionally, the transceivers 286 may be configured to operate or perform any type of encryption and on any basis.

The network 290 may be any wired network, wireless network, or combination thereof, and may comprise the Internet in whole or in part. In addition, the network 290 may be or include one or more of a personal area network, local area network, wide area network, cable network, satellite network, cellular telephone network, or combinations or portions thereof. The network 290 may also be a publicly accessible network of one or more linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (or "GSM") network, a Code Division Multiple Access (or "CDMA") network, a Long-Term Evolution (or "LTE") network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "materials handling facility," or like terms, may be automated steps performed by computer devices or resources, or implemented within software modules (or computer programs) executed by one or more general purpose computers. Those of ordinary skill in the pertinent arts would also recognize that process steps described as being performed by a "materials handling facility," or like terms, may be typically performed by a human, but could, alternatively, be performed by an automated agent. The protocols and components for providing communication between a materials handling facility and the coordinator 220 or any of the devices 210-1, 210-2 . . . 210-*n* are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors, the servers, the data stores, or the transceivers or the I/O devices of the devices 210-1, 210-2 . . . 210-*n* as well as the servers 282, the data stores 284 or the transceivers 286 of the data processing system 280, or any other computers or control systems having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the system 200 of FIG. 2 is shown as having a single area network 205, having a single coordinator 220 and three devices 210-1, 210-2 . . . 210-*n*, those of ordinary skill in the pertinent arts will recognize that the systems and methods of the present disclosure are not so limited. Rather in some embodiments, a system may include, or a method may involve, any number of PANs, each having any number of nodes or devices associated therewith. For example, in some implementations, a materials handling facility may include hundreds or even thousands of devices, and any number of coordinators or gateways in communication with such devices. Furthermore, the words "node" and "device" may be used interchangeably herein to refer to a component of a communications network, e.g., a redistribution point, or an endpoint, or any other component that is capable of generating, transmitting or receiving information or data over one or more channels and for one or more durations.

In some implementations, an area network may be made up of multiple coordinators or gateways, with each coordinator or gateway in turn providing connectivity to a set of devices (e.g., leaf nodes such as sensors or other devices).

Each of the coordinators or gateways and their respective devices may be synchronized in time, and may adopt TSCH to enable access to channels. Each of the coordinators or gateways may also be synchronized to a single coordinator, which may be called a "root coordinator," and may serve as a timing master for every other device (e.g., other coordinators and sensors).

Figure 3:
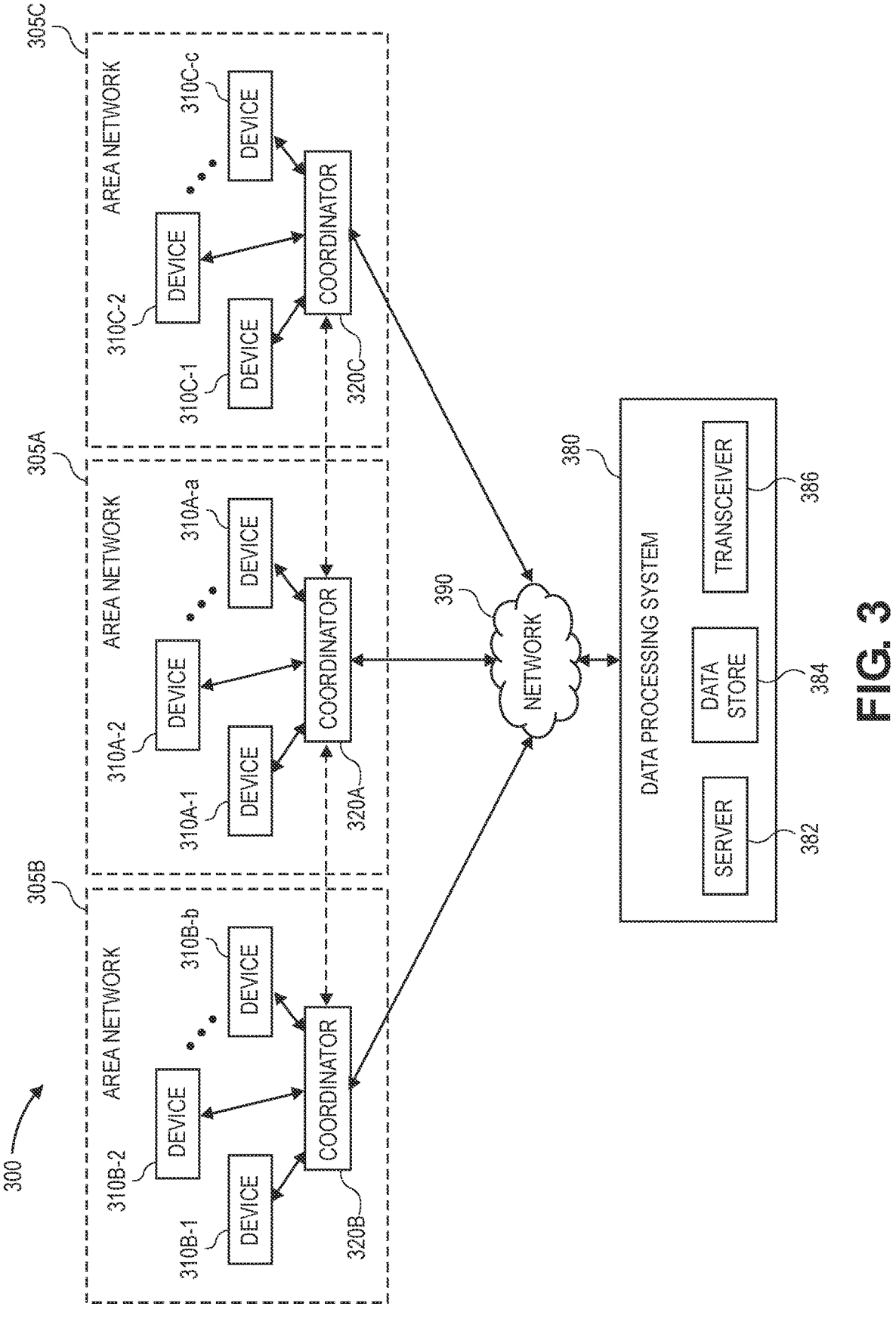
FIG. 3 is a block diagram of one system for maintaining area networks in accordance with implementations of the present disclosure.

Referring to FIG. 3, block diagrams of one system 300 for maintaining area networks in accordance with implementations of the present disclosure are shown. The system 300 includes a first area network (e.g., a personal area network, or PAN) 305A, a second area network 305B, a third area network 305C and an external network 390. Except where otherwise noted, reference numerals preceded by the number "3" in FIG. 3 refer to elements that are similar to elements having reference numerals preceded by the number "2" in FIG. 2 or by the number "1" shown in FIGS. 1A through 1I.

As is shown in FIG. 3, the area network 305A includes a first plurality of devices 310A-1, 310A-2 . . . 310A-*a* connected to a first coordinator (or gateway) 320A, while the area network 305B includes a second plurality of devices 310B-1, 310B-2 . . . 310B-*b* connected to a second coordinator (or gateway) 320B, and the area network 305C includes a third plurality of devices 310C-1, 310C-2 . . . 310C-*c* connected to a third coordinator (or gateway) 320C.

The first coordinator 320A is configured to associate with any or all of the devices 310A-1, 310A-2 . . . 310A-*a*, and to enable such devices 310A-1, 310A-2 . . . 310A-*a* to communicate with one or more external computer devices or systems, e.g., the data processing system 380 or others (not shown), over the external network 390, which may include the Internet in whole or in part. Similarly, the second coordinator 320B is configured to associate with any or all of the devices 310B-1, 310B-2 . . . 310B-*b*, and to enable such devices 310B-1, 310B-2 . . . 310B-*b* to communicate with one or more external computer devices or systems, e.g., the data processing system 380 or others (not shown), over the external network 390. Likewise, the third coordinator 320C is configured to associate with any or all of the devices 310C-1, 310C-2 . . . 310C-*c*, and to enable such devices 310C-1, 310C-2 . . . 310C-*c* to communicate with one or more external computer devices or systems, e.g., the data processing system 380 or others (not shown), over the external network 390.

Moreover, the coordinator 320A is configured to synchronize the area network 305A with the area network 305B and the area network 305C, e.g., by exchanging control signals, communication schedules, or any other information, data or metadata with the area network 305B and the area network 305C.

The coordinators 320A, 320B, 320C shown in FIG. 3 may include or share any of the same attributes, features or traits of the coordinator 220 described above with respect to FIG. 2. Similarly, each of the devices 310A-1, 310A-2 . . . 310A-*a*, the devices 310B-1, 310B-2 . . . 310B-*b*, and the devices 310C-1, 310C-2 . . . 310C-*c* shown in FIG. 3 may include or share any of the same attributes, features or traits of the devices 210-1, 210-2 . . . 210-*n* described above with respect to FIG. 2. Although FIG. 3 shows only three area networks 305A, 305B, 305C, as well as three coordinators 320A, 320B, 320C, any number of area networks may be connected to the network 390, and each of the area networks 305A, 305B, 305C may have any number of devices connected thereto.

Figure 4B:
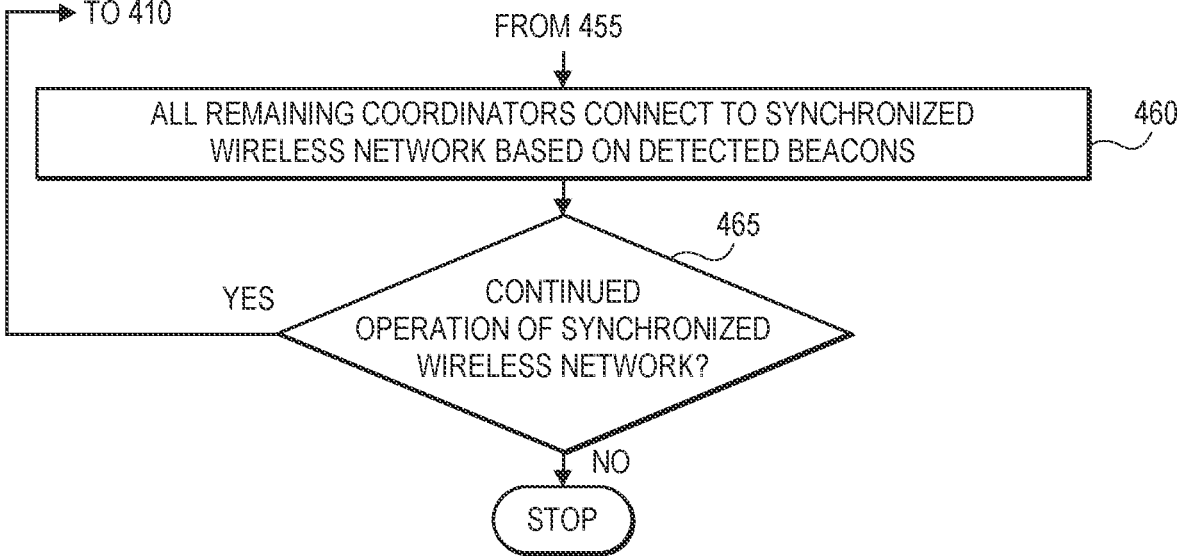

Referring to FIGS. 4A and 4B, a flow chart 400 of one process for maintaining area networks in accordance with implementations of the present disclosure is shown. At box 410, a root coordinator establishes a communication schedule for a synchronized wireless network including one or more area networks. For example, in some implementations, the synchronized wireless network may include one or more area networks, e.g., PANs, and may be formed by synchronizing one node, such as a root coordinator, with one or more other nodes, such as coordinators of one or more area networks. The communication schedule may include cells that are shared for communication by any devices of the synchronized wireless network, e.g., in a common (e.g., shared) channel and timeslot, as well as cells that are dedicated for communication between any two devices of the synchronized wireless network, e.g., in a dedicated channel and timeslot, and cells that are unscheduled, or otherwise neither shared nor dedicated. The channels or the timeslots of the communication schedule may be selected in any manner, e.g., randomly or pseudo-randomly, in a hopping sequence.

At box 415, the root coordinator transmits a beacon including information regarding the communication schedule during one or more beacon intervals. A root coordinator may advertise its presence as such by transmitting one or more beacons containing information regarding synchronization, channel hopping, or channels and timeslots that are utilized by the root coordinator or available for communication by other area networks or nodes or other devices connected thereto. Other coordinators scanning one or more channels may capture the beacon transmitted by the root coordinator and synchronize with the root coordinator, while also completing one or more authentication, authorization or security protocols. Alternatively, in some other implementations, a node that transmits the beacon may be any other type or form of device or system and need not be the root coordinator.

The beacon transmitted by the root coordinator may include any number of information elements identifying aspects of enhanced beacon intervals or superframes, or schedules thereof. In some implementations, a beacon may include an information element identifying a multicast access period of an enhanced beacon interval, e.g., a vendor-specific (or entity-specific) nested information element that denotes a number of time slots following the beacon during which a coordinator may transmit broadcast or multicast frames. A beacon may further include an information element identifying a contention access period of an enhanced beacon interval, e.g., a vendor-specific (or entity-specific) nested information element denoting a number of time slots for sensors to transmit frames of data to the coordinator. A beacon may also include an information element identifying a coordinator load, e.g., a vendor-specific (or entity-specific) information element to denote current traffic and loading on the coordinator, such as a number of nodes that have joined the coordinator. A beacon may further include an information element identifying an epoch time, e.g., a vendor-specific (or entity-specific) information element denoting a network time protocol epoch. A beacon may also include an information element identifying an operating mode of the beacon, which may denote an interval of time, e.g., a number of time slots, identifying a size of a superframe of multiple beacon intervals, as well as an interval of time during which beacons are transmitted by the coordinator. For example, in some implementations, a beacon may identify a default number of time slots representing the size of the superframe, or three hundred thirty-five, and a default interval of time by which beacons are transmitted by the coordinator, or sixtyseven. Alternatively, the beacon may identify a size of the superframe or the default interval of time by any other number of time slots.

At box 420, the coordinators of the area networks transmit beacons to nodes of their respective area networks in accordance with communication schedules established by the coordinators for their respective area networks, or by the root coordinator for the synchronized wireless network as a whole. The beacons transmitted by the coordinators may share one or more of properties of the beacon transmitted by the root coordinator at box 415, and may establish communication schedules for the respective area networks of the synchronized wireless network, such that transmissions by or between nodes of such networks do not conflict with one another.

Nodes of an area network may be any type of devices or machines, including but not limited to cameras, load sensors or electronic shelf labels as well as cash registers, climate control devices (e.g., controllers such as thermostats or components such as heaters, air conditioners, humidifiers, fans or others), remote power switches, gate sensors, turnstiles, pedestals, security cameras, radiofrequency identification (or "RFID") transmitters or receivers, motion sensors, computer devices or systems (e.g., desktop computers, laptop computers, mobile devices, smartphones, tablets or smart speakers), proximity sensors, lighting components, or any other devices or systems that may be configured to communicate over one or more networks according to any protocol or standard.

Where a coordinator of an area network establishes a schedule for communication within the area network, information regarding the schedule may be included in the beacon transmitted thereby. For example, the communication schedule may be a channel hopping schedule, e.g., a time-slotted (or time-synchronized) channel hopping schedule, or a TSCH schedule, according to the IEEE 802.15.4 protocol, or any other protocol, standard or specification. In some implementations, a schedule may include a plurality of channels and a plurality of timeslots, and may be represented as a two-dimensional matrix with cells in rows corresponding to channels (or channel offsets), and columns corresponding to timeslots. Each cell of a schedule may represent a potential link between two nodes of the area network. For example, some of the cells may be dedicated for transmissions by a single node of an area network, e.g., a dedicated cell, and some of the cells may be open and available for transmissions by any number of nodes of the area network, e.g., a shared cell.

At box 425, the coordinators and the nodes of the area networks communicate within timeslots defined in the communication schedules established by the root coordinator or the respective coordinators. For example, once a communication schedule has been established for the synchronized wireless network, the coordinators of the area networks communicate according to the communication schedule. Once a communication schedule has been established by one of the coordinators for an area network, nodes of the area network communicate according to the communication schedule. For example, an initiating node may transmit data frames to or receive data frames from a responding node, and the responding node may receive data frames from or transmit data frames to the initiating node, during one or more of such timeslots.

In some implementations, the communication schedule may include any number of activities within any of the cells, e.g., transmitting, receiving, or "sleeping," and each of the cells may offer an allocation of bandwidth for such activities. Where a cell calls for a node to transmit data to another node, the transmitting node may verify an outgoing buffer to determine whether a packet is available for transmission, and transmit the packet to the other node. Where a cell calls for a node to receive data from another node, the cell monitors a given channel to receive a given packet, and acknowledges any packets with a reply message.

At box 430, whether any of the coordinators that are synchronized with the root coordinator sense a loss of connectivity with the root coordinator is determined. For example, where the communication schedule for the synchronized wireless network as a whole includes one or more timeslots dedicated for the transmission of a beacon by the root coordinator to the coordinators, each of the coordinators may be configured to determine that connectivity with the root coordinator has been lost where a beacon is not received from the root coordinator within a dedicated timeslot for a predetermined number of the beacon intervals.

If none of the coordinators sense a loss of connectivity with the root coordinator, the process returns to box 415, where the root coordinator transmits another beacon including information regarding the communication schedule during one or more beacon intervals. The communication schedule may designate timeslots that are shared, dedicated or unassigned in the same manner as a previously transmitted beacon, or in a different manner.

If a loss of connectivity with the root coordinator is detected, however, then the process advances to box 435, where each of the coordinators having a hop count of one scans during all timeslots of the communication schedule established by the root coordinator. For example, where the communication schedule established by the root coordinator includes a plurality of channels (or channel offsets) and timeslots (or slot offsets), with sets of timeslots that are designated for dedicated communication between two or more devices, shared for communication by multiple devices, or unassigned to any nodes, the coordinators may continue to transmit their own beacons during timeslots dedicated for such purposes, but may also monitor all other timeslots within a slotframe, e.g., to capture any other beacons that may be transmitted by any other coordinators of the synchronized wireless network. Such coordinators may thereby disregard the communication schedule or otherwise monitor for beacons transmitted by other coordinators during all other timeslots.

For example, as is discussed above, beacons transmitted by the coordinators may include a variety of information elements, including one or more of the information elements shown in FIG. 1E, or others. Each coordinator that captures a beacon transmitted by another coordinator may process the beacon to determine a channel offset, a hop count, and a number of nodes connected to that coordinator from such information elements. Additionally, upon receiving transmissions of data including a beacon from another coordinator, each coordinator may determine received signal strength indicators (or "RSSI") of such transmissions, or otherwise determine strengths of signals including such transmissions in any other manner. In some implementations, a signal strength may be determined as a multi-bit value representing a level of power, e.g., a number of decibels per milliwatt (or "dBm"), received in the incoming signals. Signal strengths may be determined at any interval, e.g., every two milliseconds, or at any other interval. Alternatively, or in addition to signal strengths, a level of quality of a link to each of the coordinators that transmitted the respective signals, or the beacons contained therein, may be determined based on an energy detection level, a signal-to-noise ratio, or in any other manner.

At box 440, the coordinators with hop counts of one detect beacons transmitted by all coordinators during the timeslots of the communication schedule, and at box 445, the coordinators with hop counts of one determine offsets and hop counts of other coordinators that transmitted the beacons are determined from such beacons. Alternatively, if a coordinator having a hop count of one does not detect any other beacons transmitted by any other coordinators during timeslots of the communication schedule, the coordinator may elect itself as a root coordinator of the synchronized wireless network, and may establish a communication schedule for the synchronized wireless network and transmit beacons including information regarding the communication schedule without delay.

At box 450, the other coordinators identify one of the coordinators with the hop count of one having a lowest offset of all coordinators from the received beacons.

At box 455, the coordinator having the hop count of one and the lowest offset is elected as the root coordinator. The elected coordinator may then serve as a root of a synchronization tree for the cross-area network synchronization network.

At box 460, all remaining coordinators connect to the synchronized wireless network based on the detected beacons. The elected coordinator may then establish a communication schedule having a plurality of beacon intervals, each including a plurality of timeslots. The elected coordinator may also advertise its presence as a root coordinator by transmitting one or more beacons containing information regarding synchronization, channel hopping, or timeslots that are utilized by the elected coordinator. The other coordinators of the synchronized wireless network, or any other coordinators not previously connected to the synchronized wireless network, may then capture one of the beacons and request to synchronize or connect with the elected coordinator, while also completing one or more authentication or security protocols, as necessary.

At box 465, whether the continued operation of the synchronized wireless network is desired is determined. If the continued operation of the synchronized wireless network is desired, then the process returns to box 410, where the root coordinator elected at box 455 establishes a communication schedule for the synchronized wireless network, and to box 415, where the root coordinator transmits a beacon including the communication schedule to other coordinators during one or more beacon intervals.

Figure 5A:
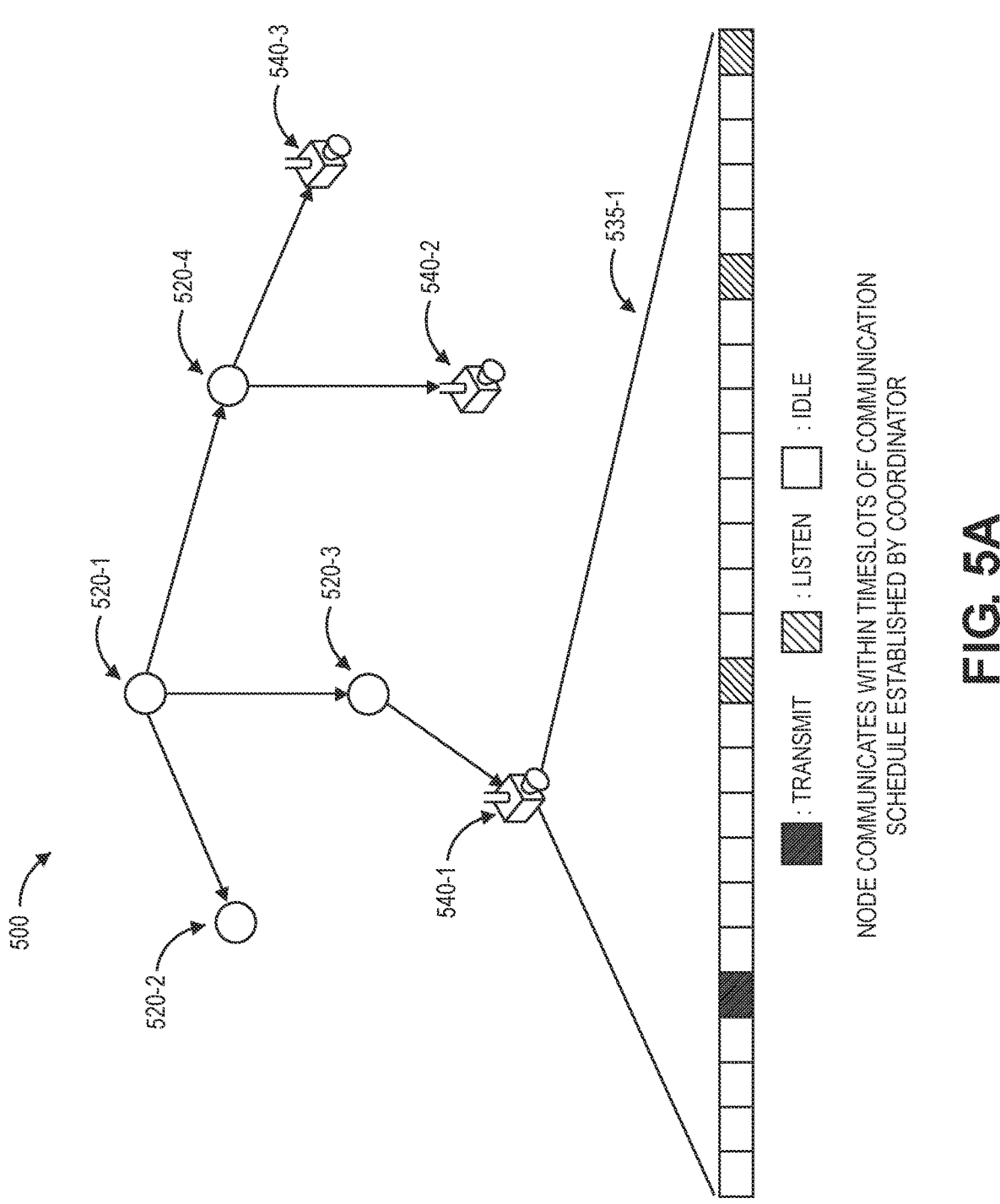
FIGS. 5A through 5C are views of aspects of one system for maintaining area networks in accordance with implementations of the present disclosure.
Figure 5B:
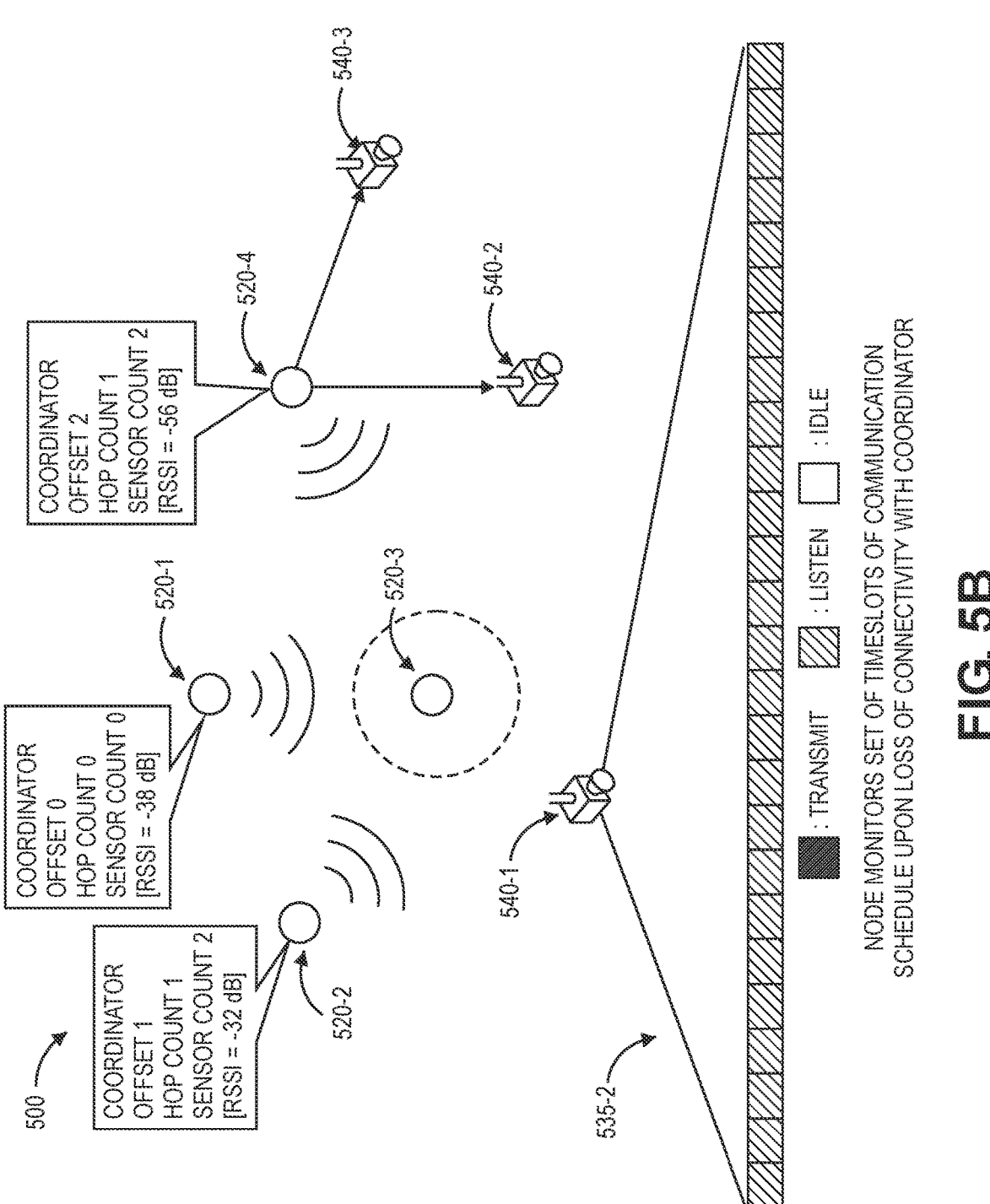
Figure 5C:
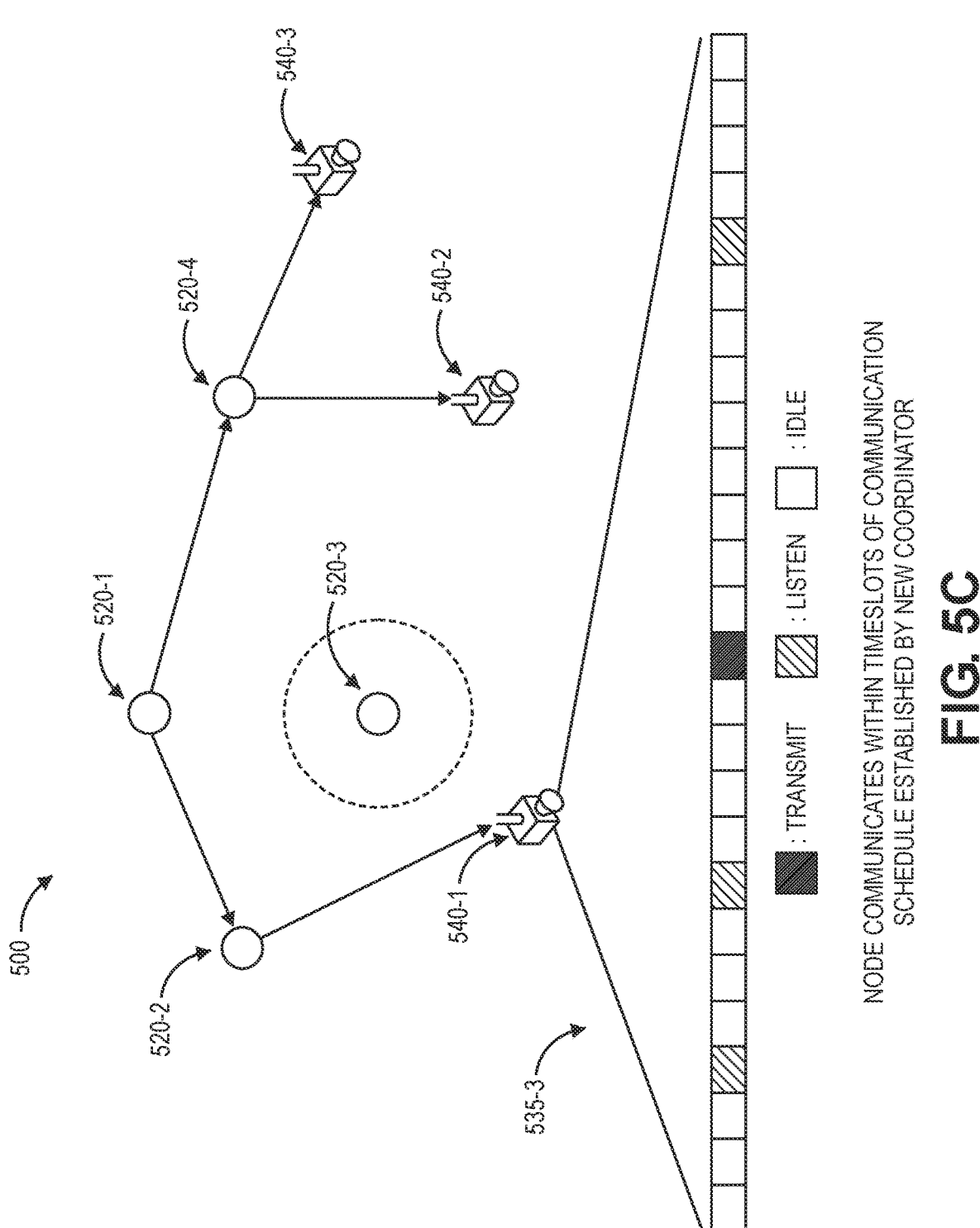

Referring to FIGS. 5A through 5C, views of aspects of one system for maintaining area networks in accordance with implementations of the present disclosure are shown. Except where otherwise noted, reference numerals preceded by the number "5" in FIGS. 5A through 5C refer to elements that are similar to elements having reference numerals preceded by the number "3" in FIG. 3, by the number "2" in FIG. 2 or by the number "1" shown in FIGS. 1A through 1I.

As is shown in FIG. 5A, a synchronization tree of a synchronized wireless network (e.g., a cross-PAN synchronization network) 500 includes a plurality of coordinators (or coordinator nodes) 520-1, 520-2, 520-3, 520-4 and a plurality of nodes (or devices or sensors) 540-1, 540-2, 540-3. The node 540-1 is connected to the coordinator 520-3 and the nodes 540-2, 540-3 are connected to the coordinator 520-4. Each of the coordinators 520-1, 520-2, 520-3, 520-4 may be any component that is configured to operate according to the 802.15.4 family of protocols, standards or specifications, or any other protocol, standard or specification. In addition to the nodes 540-1, 540-2, 540-3, which may include sensors for capturing imaging data (e.g., cameras or other imaging devices), load sensors for sensing normal loads (e.g., vertical loads), interactive displays (e.g., electronic shelf labels), or any other devices or systems, the coordinators 520-1, 520-2, 520-3, 520-4 may be further configured to communicate with any number of other nodes (not shown).

The coordinator 520-1 is a root coordinator of the synchronized wireless network 500, which is formed when the coordinator 520-1 synchronizes with other coordinators, as well as any number of other nodes. For example, upon powering up or otherwise initializing the coordinator 520-1, the coordinator 520-1 may be configured to scan one or more channels, which may be selected randomly or on any other basis, for a predetermined period of time. Upon determining that no other transmissions of signals are detected during the predetermined period of time, the coordinator 520-1 may assume the role of a root, and establish a communication schedule having a plurality of beacon intervals for the formation of a synchronized wireless network, e.g., a PAN, with any number of joining nodes (e.g., sensors or other devices), as well as any number of other coordinators. The coordinator 520-1 may then advertise its presence as such by transmitting one or more beacons containing information regarding synchronization, channel hopping, or timeslots that are utilized by the coordinator 520-1. Other nodes scanning one or more channels may then capture one of the beacons transmitted by the coordinator 520-1 and request to synchronize with the coordinator 520-1, while also completing one or more authentication or security protocols, as necessary.

Once the coordinator 520-1 is established as the root coordinator of the synchronized wireless network 500, other coordinators, such as the coordinators 520-2, 520-3, 520-4, may join the synchronized wireless network 500. Each of the other coordinators 520-2, 520-3, 520-4 may transmit one or more beacons advertising its channel offset, and also its parent offset, or a channel offset of its parent, for the formation of one or more area networks. For example, beacons transmitted by the respective coordinators may include information elements, e.g., the information elements 145E-i, 145G-i of the beacon **140-*i*** of FIG. 1E, identifying the channel offsets of the respective coordinators, and the parent offsets of the respective coordinators, and identify channels or timeslots that are available for communication by nodes connected thereto.

For example, as is shown in FIG. 5A, the node 540-1 may receive information from the coordinator 520-3 regarding a communication schedule 535-1, a portion of which is shown in FIG. 5A. The communication schedule 535-1 may be established in accordance with a channel hopping protocol, e.g., a TSCH protocol, and includes a set of timeslots that are dedicated for communication with the coordinator 520-3, a set of timeslots that are shared for communication by other devices or systems (not shown), and a set of timeslots that are idle or otherwise unassigned. The timeslots of the communication schedule 535-1 may hop in tandem over a set of channels, and may repeat over time, e.g., in a slotframe.

The communication schedule 535-1 may be established by the coordinator 520-3 based on a communication schedule received from the coordinator 520-1 for the synchronized wireless network 500, or on any other basis. For example, idle portions of the communication schedule 535-1 promulgated by the coordinator 520-3 to the node 540-1 and others (not shown) may be designated as such to enable coordinators or other nodes of other area networks, e.g., the coordinator 520-4 and the nodes 540-2, 540-3, to communicate accordingly.

The systems and methods of the present disclosure may enhance the reliability of cross-PAN synchronization networks, such as the synchronized wireless network 500 of FIG. 5A, by enabling nodes of area networks within such synchronization networks to connect or reconnect to coordinators upon losses of connectivity with their coordinators. For example, as is shown in FIG. 5B, upon a loss of connectivity with the coordinator 520-3, the node 540-1 may operate according to a modified communication schedule 535-2, a portion of which is shown in FIG. 5B. Pursuant to the modified communication schedule 535-2, the node 540-1 transmits data within one or more timeslots of a slotframe previously designated for such purposes, and monitors or listens for signals within all other timeslots in the same channel or in all other channels of the slotframe, including not only channels and timeslots that had previously been dedicated for communication with the coordinator 520-3 or shared for communication by other devices or systems (not shown) but also channels and timeslots that are otherwise idle or otherwise unassigned.

Alternatively, in some implementations, the modified communication schedule 535-2 may include any number of channels and timeslots, and may not be limited to a single slotframe. For example, where a communication schedule for the synchronized wireless network 500 or any area network is according to a beacon interval, or a superframe having any number of beacon intervals, the modified communication schedule 535-2 may include any number of consecutive timeslots, e.g., sixty-four timeslots, within one or more channels during which the node 540-1 may transmit data, or monitor or listen for data.

Upon detecting beacons from other coordinators of the synchronized wireless network 500, viz., the coordinators 520-1, 520-2, 520-4, the node 540-1 may evaluate each of such coordinators based on contents of the respective beacons, and determine their offsets, hop counts, numbers of connected nodes from such beacons, as well as signal strengths of the transmissions that included the beacons. For example, as is shown in FIG. 5B, the node 540-1 may determine that the coordinator 520-2 has an offset of one, a hop count of one, and no connected nodes, as well as a signal strength of −32 decibels, while also determining that the coordinator 520-1 is the root coordinator and has an offset of zero, a hop count of zero, and two connected nodes, and a signal strength of −38 decibels, and that the coordinator 520-4 has an offset of two, a hop count of one, and two connected nodes, and a signal strength of −56 decibels.

As is shown in FIG. 5C, based on beacons received from each of the coordinators 520-1, 520-2, 520-4, the node 540-1 selects the coordinator 520-2, and synchronizes with the coordinator 520-2, while also completing one or more authentication, authorization or security protocols. The coordinator 520-2 may then establish a communication schedule 535-3 that enables the node 540-1 to communicate within one or more timeslots and channels, which may be dedicated to the node 540-1 alone or shared with one or more other nodes.

Figure 6B:
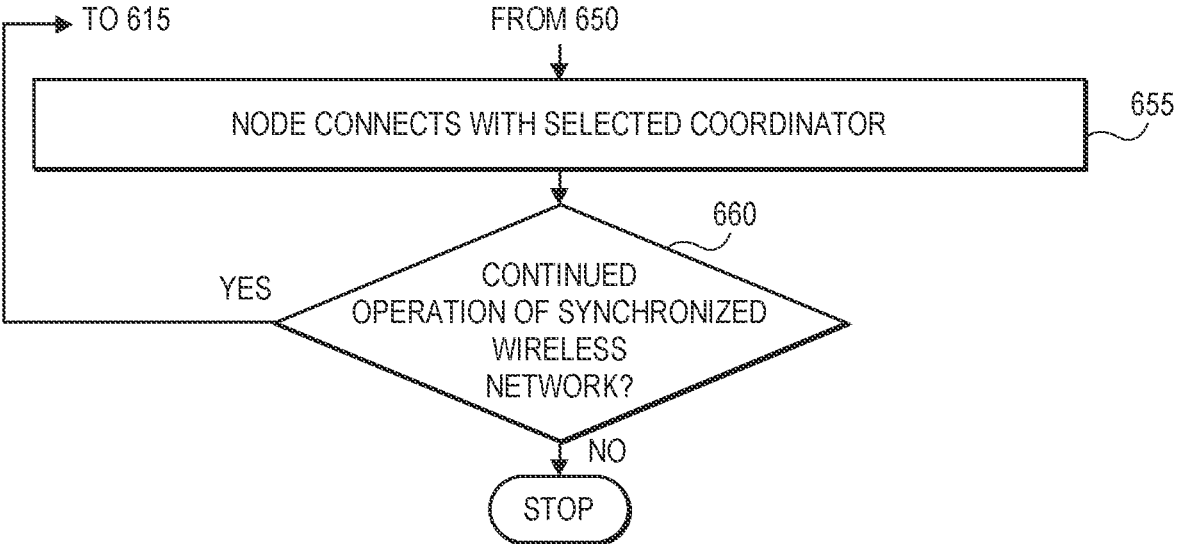

Referring to FIGS. 6A and 6B, a flow chart 600 of one process for maintaining area networks in accordance with implementations of the present disclosure is shown. At box 610, a root coordinator establishes a communication schedule for a synchronized wireless network including one or more area networks, and at box 615, the root coordinator transmits a beacon including information regarding the communication schedule during one or more beacon intervals. The synchronized wireless network may include one or more area networks, e.g., PANs, and may be formed by synchronizing one node, such as a root coordinator, with one or more other nodes, such as coordinators of one or more area networks. The communication schedule may include cells that are shared for communication by any devices of the synchronized wireless network, e.g., in a common (e.g., shared) channel and timeslot, as well as cells that are dedicated for communication between any two devices of the synchronized wireless network, e.g., in a dedicated channel and timeslot, and cells that are unscheduled, or otherwise neither shared nor dedicated. The channels or the timeslots of the communication schedule may be selected in any manner, e.g., randomly or pseudo-randomly, in a hopping sequence.

At box 620, the coordinators of the area networks transmit beacons to nodes of their respective area networks in accordance with the communication schedules established by the root coordinator for the synchronized wireless network as a whole, and by the coordinators for their respective area networks. At box 625, the coordinators and the nodes of the area networks communicate within timeslots defined in the communication schedules established by the root coordinator or the respective coordinators. The beacons transmitted by the coordinators may share one or more of properties of the beacon transmitted by the root coordinator at box 615, and may establish communication schedules for the respective area networks of the synchronized wireless network, such that transmissions by or between nodes of such networks do not conflict with one another.

At box 630, whether a node of an area network senses a loss of connectivity with a coordinator of the area network is determined. A node may be configured to determine that connectivity with the coordinator has been lost where a beacon is not received from the coordinator within a dedicated timeslot for a predetermined number of beacon intervals, after a predetermined time, or on any other basis.

If none of the nodes of the area networks senses a loss of connectivity with coordinator, the process returns to box 615, where the root coordinator transmits another beacon including information regarding the communication schedule to the coordinators during one or more beacon intervals, and to box 620, where the coordinators of the area networks transmit beacons to nodes of their respective area networks in accordance with the communication schedules.

If a node detects a loss of connectivity with a coordinator, then the process advances to box 635, where the node scans during a set of timeslots of the communication schedule established by the coordinator for which connectivity was lost. For example, where the communication schedule established by the coordinator includes a plurality of channels (or channel offsets) and timeslots (or slot offsets), with sets of timeslots designated for dedicated communication between two or more devices, shared for communication by multiple devices, or unassigned, other coordinators may continue to transmit their own beacons during timeslots of the communication schedule, and the node may monitor such timeslots to detect beacons of such other coordinators for a single slotframe, or for any number of consecutive channels and timeslots, e.g., sixty-four timeslots.

At box 640, the node detects beacons transmitted by other coordinators during the timeslots of the communication schedule, and at box 645, the node determines numbers of nodes connected to such other coordinators from the beacons, as well as signal strengths of signals received from such coordinators. Alternatively, or additionally, the node may determine offsets, hop counts, or any other attributes of such coordinators.

At box 650, the node selects a single coordinator from multiple coordinators having the lowest offset based on their respective numbers of connected nodes and/or signal strengths.

At box 655, the node connects to the coordinator selected at box 650.

At box 660, whether the continued operation of the synchronized wireless network is desired is determined. If the continued operation of the synchronized wireless network is desired, then the process returns to box 615, where the root coordinator transmits another beacon including information regarding the communication schedule to the coordinators during one or more beacon intervals, and to box 620, where the coordinators of the area networks transmit beacons to nodes of their respective area networks in accordance with the communication schedules. If the continued operation of the synchronized wireless network is no longer desired, however, the process ends.

Although some implementations of the present disclosure describe the use of area networks to provide network access in various commercial settings, those of ordinary skill in the pertinent arts will realize that the systems and methods of the present disclosure are not so limited. Rather, the systems and methods of the present disclosure may be utilized in connection with any facility where access to networks is desired.

Moreover, those of ordinary skill in the pertinent arts will recognize that nodes of an area network may be any type or form of devices or systems, including not only cameras or imaging devices but also load sensors, electronic shelf labels, cash registers, climate control devices, remote power switches, gate sensors, turnstiles, pedestals, security cameras, RFID transmitters or receivers, motion sensors, computer devices or systems, proximity sensors, lighting components, or any other devices or systems that may be configured to communicate over one or more networks according to any protocol or standard.

Likewise, the data transmitted between nodes of the area networks disclosed herein may include any information or data captured or shared by such nodes during operations, and may but need not include imaging data. For example, where a node of an area network is a load sensor, the node may transmit data representative of changes in loading, indicating that an increase or a decrease in the loading has occurred, or an amount representative of the increase or the decrease.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4A and 4B, or 6A and 6B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:

a synchronized wireless network including a plurality of area networks, wherein the synchronized wireless network comprises a plurality of coordinator nodes and a plurality of devices, wherein a first coordinator node of the plurality of coordinator nodes is a root of the synchronized wireless network, wherein each of the plurality of area networks comprises one of a subset of the plurality of coordinator nodes other than the first coordinator node as a coordinator, wherein each of the plurality of devices is associated with one of the plurality of area networks, and wherein each of the coordinator nodes of the subset is configured to execute a method comprising:

monitoring at least one communication channel of a plurality of communication channels;

receiving a first set of data from the first coordinator node at a first time, wherein the first set of data comprises a first beacon having a first plurality of information elements representing a first communication schedule for the synchronized wireless network, wherein the first communication schedule comprises a plurality of timeslots, and wherein the first time corresponds to a first timeslot of the plurality of timeslots;

determining the first communication schedule for the synchronized wireless network from the first beacon;

generating a communication schedule for one of the plurality of area networks, wherein the communication schedule comprises the plurality of timeslots, wherein the communication schedule identifies at least one timeslot for communication by the one of the coordinator nodes of the subset within the plurality of communication channels;

transmitting a set of data within the at least one timeslot for communication by the one of the coordinator nodes, wherein the set of data comprises a beacon having a plurality of information elements representing the communication schedule for the one of the plurality of area networks;

determining that a second set of data was not received from the first coordinator node during the first timeslot;

in response to determining that the second set of data was not received from the first coordinator node during the first timeslot, transmitting a set of data within the at least one timeslot for communication by the one of the coordinator nodes, wherein the set of data comprises the beacon;

designating all timeslots of the first communication schedule other than the at least one timeslot for receiving data;

receiving sets of data from each of the other coordinator nodes of the subset, wherein each of the sets of data comprises a beacon generated by one of the other coordinator nodes of the subset;

determining that at least a second coordinator node of the subset of coordinator nodes has a hop count of one and a lowest channel offset of the subset of coordinator nodes; and selecting the second coordinator node as a root coordinator of the synchronized wireless network.

2. The system of claim 1, wherein selecting the second coordinator node as the root coordinator comprises:

determining, based at least in part on a second beacon received from the second coordinator node, at least:

a channel offset of the second coordinator node;

a hop count of the second coordinator node;

a number of nodes connected to the second coordinator node; and a strength of a signal transmission received from the second coordinator node; and determining, based at least in part on a third beacon received from a third coordinator node, at least:

a channel offset of the third coordinator node;

a hop count of the third coordinator node;

a number of nodes connected to the third coordinator node; and a strength of a signal transmission received from the third coordinator node; and determining that the channel offset of the second coordinator node is less than the channel offset of the third coordinator node.

3. The system of claim 1, wherein each of the beacons transmitted by one of the coordinator nodes of the subset comprises:

an information element representing an identifier of the one of the coordinator nodes of the subset;

an information element representing a length of the beacon transmitted by the one of the coordinator nodes of the subset;

an information element representing a hop count of the one of the coordinator nodes of the subset, wherein the hop count of the one of the coordinator nodes of the subset is a number of nodes between the one of the coordinator nodes of the subset and the first coordinator node; and an information element representing a channel offset of the one of the coordinator nodes of the subset.

4. The system of claim 1, wherein the first communication schedule is a channel hopping schedule comprising a plurality of cells in a matrix defined by a plurality of channels and a plurality of timeslots, and wherein each of the communication schedules generated by the coordinator nodes of the subset is a channel hopping schedule comprising the plurality of cells in the matrix of the first communication schedule.

5. The system of claim 1, wherein each of the plurality of devices is one of:

an antenna;

a camera;

a cash register;

a climate control system;

a computer system;

a gate sensor;

an electronic label configured to display at least one of an identifier of at least one item or a price of the at least one item;

a light;

a load sensor;

a motion sensor;

a power switch;

a proximity sensor;

a radiofrequency identification transmitter or receiver; or a turnstile.

6. A method comprising:

transmitting, by a first node of a synchronized wireless network, a first beacon comprising a first plurality of information elements, wherein the first beacon comprises information regarding a first communication schedule having a plurality of channels and a plurality of timeslots, and wherein the first beacon is transmitted within a first timeslot of the first communication schedule;

capturing, by a second node of the synchronized wireless network, the first beacon;

determining, by the second node, that a second beacon is not received from the first node within the first timeslot of the first communication schedule for a predetermined period of time;

in response to determining that the second beacon is not received from the first node within the first timeslot of the first communication schedule for the predetermined period of time, monitoring, by the second node, each of the plurality of channels and the plurality of timeslots of the first communication schedule;

capturing, by the second node, a third beacon transmitted by a third node, wherein the third beacon is transmitted by the third node during one of the plurality of channels and at least one of the plurality of timeslots of the first communication schedule, and wherein the third beacon comprises an information element identifying a hop count of the third node and a channel offset of the third node;

capturing, by the second node, a fourth beacon transmitted by a fourth node, wherein the fourth beacon is transmitted by the fourth node during one of the plurality of channels and at least one of the plurality of timeslots of the first communication schedule, and wherein the fourth beacon comprises an information element identifying a hop count of the fourth node and a channel offset of the fourth node;

selecting, by the second node, one of the third node or the fourth node based at least in part on the third beacon and the fourth beacon; and synchronizing, by the second node, with the selected one of the third node or the fourth node.

7. The method of claim 6, wherein selecting the one of the third node or the fourth node comprises:

determining, by the second node, that the one of the third node or the fourth node has a lowest channel offset, wherein the one of the third node or the fourth node is selected in response to determining that the one of the third node or the fourth node has the lowest channel offset.

8. The method of claim 6, further comprising:

in response to determining that the second beacon is not received from the first node within the first timeslot of the first communication schedule for the predetermined period of time, determining that the hop count of the third node is one; and determining that the hop count of the fourth node is one.

9. The method of claim 6, further comprising:

calculating, by the second node, a first received signal strength indicator for data received from the third node based at least in part on the third beacon, and calculating, by the second node, a second received signal strength indicator for data received from the fourth node based at least in part on the fourth beacon, wherein the one of the third node or the fourth node is selected based at least in part on the first received signal strength indicator and the second received signal strength indicator.

10. The method of claim 6, wherein the first node is a coordinator of the synchronized wireless network, and wherein the second node is a coordinator of an area network of the synchronized wireless network.

11. The method of claim 6, wherein the third node is a coordinator of a first area network of the synchronized wireless network, and wherein the fourth node is a coordinator of a second area network of the synchronized wireless network.

12. The method of claim 6, wherein the first node is a coordinator of an area network of the synchronized wireless network, and wherein the second node is one of:

an antenna;

a camera;

a cash register;

a climate control system;

a computer system;

a gate sensor;

an electronic label configured to display at least one of an identifier of at least one item or a price of the at least one item;

a light;

a load sensor;

a motion sensor;

a power switch;

a proximity sensor;

a radiofrequency identification transmitter or receiver; or a turnstile.

13. The method of claim 12, wherein each of the first node and the second node is provided within a materials handling facility.

14. The method of claim 6, wherein the third beacon comprises:

an information element representing an identifier of the third node;

an information element representing a length of the third beacon;

an information element representing an indication whether the third node is capable of participating in the synchronized wireless network;

an information element representing a hop count of the third node, wherein the hop count of the third node is a number of nodes between the third node and a root of the synchronized wireless network;

an information element representing the channel offset of the third node; and an information element representing a channel offset of the first node, and wherein the fourth beacon comprises:

an information element representing an identifier of the fourth node;

an information element representing a length of the fourth beacon;

an information element representing an indication whether the fourth node is capable of participating in the synchronized wireless network;

an information element representing a hop count of the fourth node, wherein the hop count of the fourth node is a number of nodes between the fourth node and a root of the synchronized wireless network;

an information element representing the channel offset of the fourth node; and an information element representing the channel offset of the first node.

15. The method of claim 6, wherein the first communication schedule is a channel hopping schedule comprising a plurality of cells in a matrix defined by a plurality of channels and a plurality of timeslots.

16. The method of claim 15, wherein the first communication schedule is generated in accordance with a medium access control protocol according to IEEE 802.15.4.

17. The method of claim 6, wherein the predetermined period of time is approximately one second.

18. The method of claim 6, wherein the first communication schedule represents an interval of time defined by a number of the plurality of timeslots and a duration of the timeslots, and wherein the predetermined period of time is a predetermined number of the intervals of time.

19. A sensor comprising:

one or more processors;

one or more memory components;

one or more transceivers; and one or more antenna modules, wherein the one or more memory components are programmed with one or more sets of instructions that, when executed by the one or more processors, cause the sensor to execute a method comprising:

monitoring at least one communication channel for a first period of time;

receiving a first beacon via the at least one communication channel at a first time during the first period of time, wherein the first beacon comprises a plurality of information elements, and wherein the first beacon was transmitted by a first coordinator node;

determining a first communication schedule based at least in part on the first beacon, wherein the first communication schedule comprises a plurality of timeslots within a plurality of communication channels, and wherein the first time is within a first timeslot of the plurality of timeslots;

monitoring at least the first communication channel for a second period of time;

determining that a second beacon is not received within the first timeslot of the first communication channel during the second period of time;

in response to determining that the second beacon is not received within the first timeslot of the first communication channel during the second period of time, monitoring a predetermined number of timeslots within at least one of the plurality of communication channels for a third period of time;

receiving a plurality of beacons, wherein each of the plurality of beacons is received from one of a plurality of coordinator nodes during the third period of time, wherein the first coordinator node is not the one of the plurality of coordinator nodes, wherein each of the plurality of beacons comprises a plurality of information elements, and wherein one of the information elements represents an offset of the one of the plurality of coordinator nodes;

determining numbers of nodes connected to each of the plurality of coordinator nodes and strengths of signals transmitted by each of the plurality of coordinator nodes based at least in part on the plurality of beacons;

selecting a second coordinator node based at least in part on a third beacon, wherein the third beacon is one of the plurality of beacons received from the second coordinator node;

determining a second communication schedule based at least in part on the third beacon, wherein the second communication schedule comprises a plurality of timeslots within a plurality of communication channels; and transmitting at least one set of data to the second coordinator node in accordance with the second communication schedule.

20. The sensor of claim 19, wherein the sensor is one of:

an antenna;

a camera;

a cash register;

a climate control system;

a computer system;

a gate sensor;

an electronic label configured to display at least one of an identifier of at least one item or a price of the at least one item;

a light;

a load sensor;

a motion sensor;

a power switch;

a proximity sensor;

a radiofrequency identification transmitter or receiver; or a turnstile.

\* \* \* \* \*